US012470077B2

(12) United States Patent
Neeld

(10) Patent No.: US 12,470,077 B2
(45) Date of Patent: *Nov. 11, 2025

(54) ACTIVE CONTAINER WITH DATA BRIDGING

(71) Applicant: Doubleday Acquisitions LLC, Monroe, OH (US)

(72) Inventor: Jonathan Peter Neeld, Centerville, OH (US)

(73) Assignee: Doubleday Acquisitions LLC, Monroe, OH (US)

( * ) Notice: Subject to any disclaimer, the term of this patent is extended or adjusted under 35 U.S.C. 154(b) by 70 days.

This patent is subject to a terminal disclaimer.

(21) Appl. No.: 18/225,717

(22) Filed: Jul. 25, 2023

(65) Prior Publication Data

US 2024/0030734 A1      Jan. 25, 2024

Related U.S. Application Data

(63) Continuation of application No. 16/046,286, filed on Jul. 26, 2018, now Pat. No. 11,750,008.

(Continued)

(51) Int. Cl.
*H02J 7/00* (2006.01)
*B65D 88/74* (2006.01)
(Continued)

(52) U.S. Cl.
CPC ............ *H02J 7/0068* (2013.01); *B65D 88/74* (2013.01); *B65D 90/0073* (2013.01);
(Continued)

(58) Field of Classification Search
CPC ........ H02J 7/0068; H02J 50/10; B65D 88/74; B65D 90/0073; B65D 90/48;
(Continued)

(56) References Cited

U.S. PATENT DOCUMENTS 9,702,610 B2 *   7/2017   Iwasa ..................... H02J 50/12
10,453,572 B1   10/2019   Brooks et al.
(Continued)

FOREIGN PATENT DOCUMENTS

CN      201947442 U     8/2011
CN      205418773 U     8/2016
(Continued)

OTHER PUBLICATIONS

International Search Report and Written Opinion dated Oct. 15, 2018, for International Application No. PCT/US2018/044761, 13 pages.

(Continued)

*Primary Examiner* — Daryl C Pope
(74) *Attorney, Agent, or Firm* — Frost Brown Todd LLP

(57) ABSTRACT

A container having a battery and one or more active systems for maintaining temperature or other characteristics of goods stored within the container relies on a battery to maintain those active systems during transit. The size of the battery required for such applications may be reduced by providing access to external power during a shipment cycle. For example, shelves within transit vehicles or warehouses can supply electricity to the active systems via a wireless or wired connection, or they may recharge the container's battery, or both. The container may also have data bridging capabilities that use short range wireless technology to communicate with nearby devices that have access to other data streams, such as GPS data and internet connectivity. When bridged with a provider, the container may have access to new data streams, or may be able to disable internal devices providing those same data streams to conserve power.

20 Claims, 13 Drawing Sheets

Related U.S. Application Data

(60) Provisional application No. 62/540,096, filed on Aug. 2, 2017, provisional application No. 62/540,099, filed on Aug. 2, 2017.

(51) Int. Cl.
  *B65D 90/00* (2006.01)
  *B65D 90/48* (2006.01)
  *G06Q 10/087* (2023.01)
  *G07C 9/00* (2020.01)
  *G07C 9/20* (2020.01)
  *G08B 21/18* (2006.01)
  *H02J 50/10* (2016.01)
  *H04L 12/46* (2006.01)

(52) U.S. Cl.
  CPC .......... *B65D 90/48* (2013.01); *G06Q 10/087* (2013.01); *G07C 9/00896* (2013.01); *G07C 9/20* (2020.01); *G08B 21/18* (2013.01); *G08B 21/182* (2013.01); *H02J 50/10* (2016.02); *H04L 12/4604* (2013.01); *B65D 2590/0083* (2013.01); *G07C 2009/00642* (2013.01); *G07C 2009/0092* (2013.01)

(58) Field of Classification Search
  CPC .......... B65D 2590/0083; G06Q 10/087; G07C 9/00896; G07C 9/20; G07C 2009/00642; G07C 2009/0092; G08B 21/18; G08B 21/182; H04L 12/4604
  See application file for complete search history.

(56) References Cited

U.S. PATENT DOCUMENTS

| | | | |
|---|---|---|---|
| 11,750,008 B2* | 9/2023 | Neeld | H02J 7/0068 709/223 |
| 2004/0178880 A1* | 9/2004 | Meyer | G06Q 10/0833 340/5.3 |
| 2006/0051121 A1 | 3/2006 | Matsusaka et al. | |
| 2008/0246587 A1 | 10/2008 | Fisher | |
| 2009/0135015 A1 | 5/2009 | Dobson et al. | |
| 2012/0056474 A1 | 3/2012 | Larson et al. | |
| 2013/0245991 A1* | 9/2013 | Kriss | F25D 29/003 702/150 |
| 2013/0319020 A1* | 12/2013 | Neeld | F25B 49/02 62/126 |
| 2016/0063842 A1 | 3/2016 | Sun | |
| 2016/0239802 A1* | 8/2016 | Burch, V | H04W 4/12 |
| 2016/0342342 A1 | 11/2016 | Kan et al. | |
| 2016/0342942 A1 | 11/2016 | Rice et al. | |
| 2019/0044753 A1* | 2/2019 | Neeld | B65D 90/0073 |

FOREIGN PATENT DOCUMENTS

| | | |
|---|---|---|
| CN | 106586276 A | 4/2017 |
| JP | H05-066081 A | 5/1986 |
| JP | H08-198383 A | 8/1996 |
| JP | H10-236536 A | 9/1998 |
| JP | 2002-130902 A | 5/2002 |
| JP | 2003-252442 A | 9/2003 |
| JP | 2005-172395 A | 6/2005 |
| JP | 2010-023580 A | 2/2010 |
| JP | 2012-172906 A | 9/2012 |
| JP | 2012-197136 A | 10/2012 |
| JP | 2014-178106 A | 9/2014 |
| JP | 2015-060570 A | 3/2015 |
| JP | 2016-044913 A | 4/2016 |
| JP | 2020-530095 A | 10/2020 |
| WO | WO 2001/097664 A1 | 12/2001 |
| WO | WO 2016/014294 A1 | 1/2016 |
| WO | WO 2016/181223 A2 | 11/2016 |

OTHER PUBLICATIONS

International Search Report and Written Opinion dated Oct. 3, 2018, for International Application No. PCT/US2018/044811, 13 pages.
Japanese Notification of Reasons for Refusal dated Feb. 24, 2021, for Application No. 2020-505404, 9 pages.
Japanese Notification of Reasons for Refusal dated Nov. 22, 2022, for Application No. 2022-041210, 8 pages.
European Communication dated May 15, 2025, for Application No. 18755641.0, 11 pages.

* cited by examiner

US 12,470,077 B2

ACTIVE CONTAINER WITH DATA BRIDGING

PRIORITY

This application claims priority to U.S. provisional patent application 62/540,096, filed Aug. 2, 2017, and entitled "System for Providing In-Transit Power for Active Storage Containers," and U.S. provisional patent application 62/540,099, filed Aug. 2, 2017, and entitled "Active Container with Data Bridging," the disclosures of each of which are hereby incorporated by reference.

FIELD

The disclosed technology pertains to a system for providing in-transit power and data bridging for active storage containers.

BACKGROUND

Goods shipped in containers may have thresholds for such factors as temperature, motion, humidity, and other characteristics of their storage environment. Fragile objects may require protection from contact with rigid objects or may require minimization of sudden forceful accelerations; medicines such as vaccines and food products may require a storage temperature within certain ranges; and electronics and paper goods may require a storage humidity within certain ranges. Deviations outside of acceptable ranges for these characteristics may affect the quality or efficacy of a shipped good, or in some cases may even completely ruin a good or make it harmful when used for its intended purpose. In some instances, goods may be appropriately shipped in passive containers which may be, for example, insulated and sealed containers having ice packs, vacuum, or cooled air stored inside. In other instances, passive features such as insulation and ice pack may not be sufficient, such as during lengthy transits in which ice will eventually melt, or with goods that may have a storage temperature range that is above freezing.

In these instances, active containers that include active heating and/or cooling systems may be used to meet temperature requirements. This introduces several issues beyond cost and complexity, one being the need to ensure power delivery to the active systems of an active container throughout a transit that may last for more than 100 hours. With variable storage conditions and variable lengths of transit, determining precise power needs throughout the transit can be difficult or impossible. As a result, active containers are equipped with large batteries that can carry an adequate charge for regulating the temperature of stored goods during transit. While providing larger and more efficient batteries provides some flexibility in transit, the added battery weight increases fuel usage and shipping costs, and the added battery size reduces the volume of goods that can be shipped in a single active storage container. Since batteries tend to scale very poorly for transit applications, increasing their size and weight in this manner is not ideal.

Each feature of an active container represents additional battery charge requirements. As a result, active containers that are capable of controlling temperature of goods, tracking temperature, tracking location, and other similar features may require large and heavy batteries that increase the cost of shipment and reduce the available space for goods within the container. Conversely, reducing the number of active features or reducing the reliance upon active features that are present may reduce battery requirements, and allow for additional goods to be shipped at lower costs.

Another limitation of many conventional active containers is that information gathered from sensors such as temperature sensors and GPS systems can only be used to retroactively identify problems rather than actively identify and resolve potential problems. While it may be useful to know that a medicine has been destroyed by being stored outsides of an acceptable temperature range when it arrives at its destination, it may be more desirable to alert the risk of storage outside of the acceptable range at the earliest opportunity, so that a responsible party can intervene and prevent or address the unacceptable storage conditions.

The above limitation is not easily addressed, since devices such as GPS systems or communication systems may not be available at all times during transit. For example, if an active container is placed in the cargo hold of an airplane for a lengthy flight, government or airplane regulations may require that long range wireless communication features such as GPS be disabled to prevent interference with critical flight systems. As another example, some warehouses or courier vehicles may be wireless communication dead zones due to their location or construction material, such that active containers stored within are incapable of sending and receiving long range wireless communications, which may prevent GPS data from being available while the container is present in such an area.

What is needed, therefore, is an improved system for providing in-transit power sources and data bridging for active containers.

BRIEF DESCRIPTION OF THE DRAWINGS

The drawings and detailed description that follow are intended to be merely illustrative and are not intended to limit the scope of the invention.

DETAILED DESCRIPTION

Figure 1:
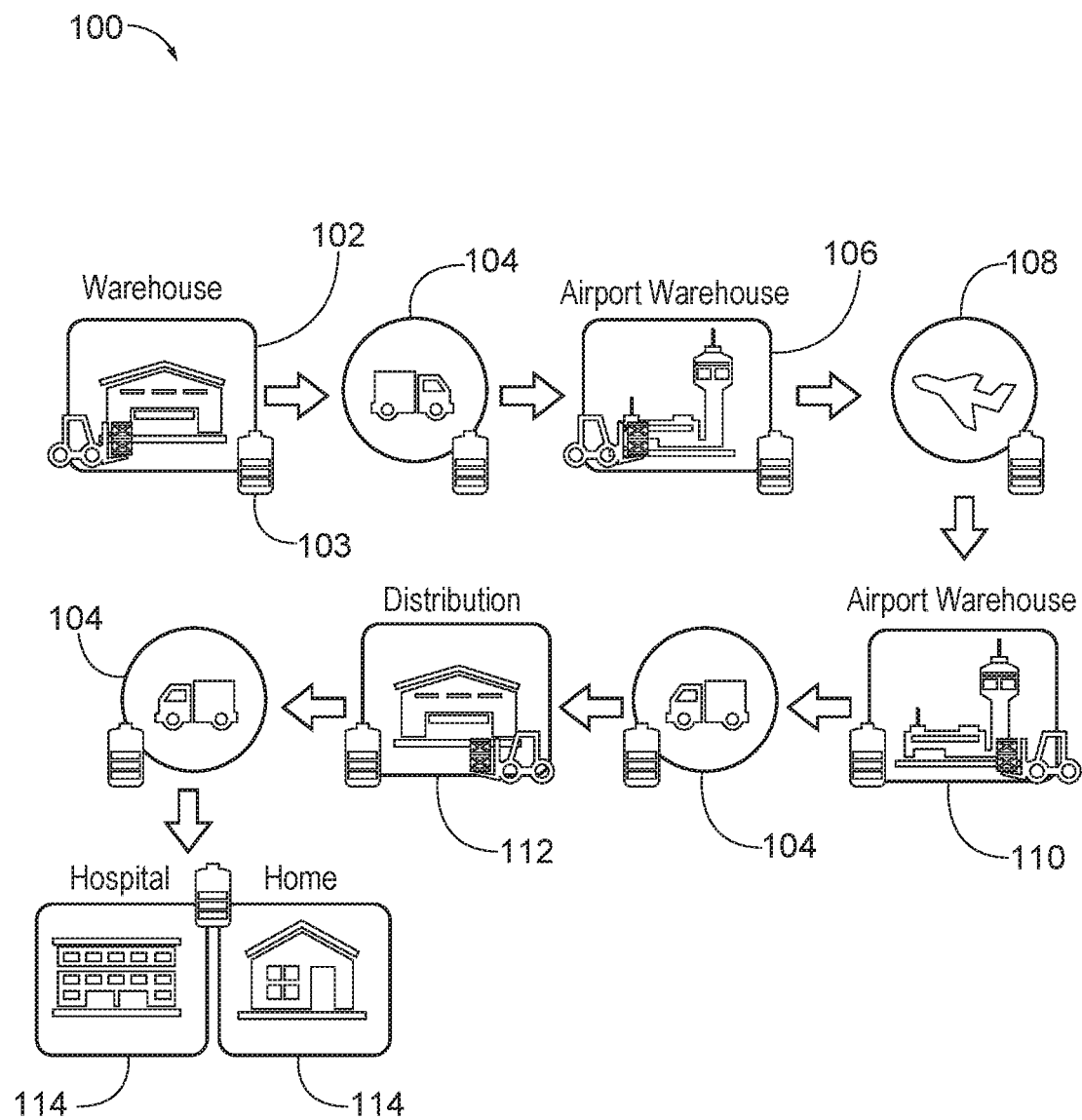
FIG. 1 is a flow diagram showing a conventional active container transit.

The novel technology that, for the purpose of illustration, is disclosed herein is described in the context of the shipment and storage of active containers. While the disclosed applications of this technology satisfy a long-felt but unmet need in the art of the shipment and storage of active containers, it should be understood that this technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

The disclosed system for providing in-transit power for active containers may be implemented by creating or modifying storage points for an active container, such as shelves, racks, or lockers in a vehicle or warehouse, so that the storage points include an external power supply that is configured to provide power to an active container when it is placed in the storage point. Active containers configured to be used with the system will have an internal battery that is used to provide power to one or more active systems, such as temperature control systems, humidity control systems, or location tracking systems, and that is capable of receiving power from the external power supply when the active container is placed in the storage point. Some implementations of the disclosed system may require a mechanical connection, such as a cable connection or docking connection, to be made between the external power supply and the active container, but others will instead rely on wireless power transfer so that active containers may be automatically connected to an external power supply as a result of the act of placing the active container in the storage point.

It should be understood that the teachings disclosed herein can be applied to containers used in a variety of contexts. For example, this could include reusable containers owned by a party that sends or receives them, containers with limited reusability that are purchased and used for one or more shipments, and containers that may be rented or leased from a provider and used by a party that sends or receives them. Further, the teachings disclosed herein can be applied to containers having a variety of features. For example, this could include containers having active temperature control systems (e.g., integrated compressors or thermoelectric devices that can produce heat or cold and maintain or change a current temperature), containers having semi-active temperature control systems (e.g., containers that do not produce heat or cold during transit, but have materials and devices that help it to retain and maintain a starting temperature such as eutectic plates and circulation fans), and passively temperature controlled containers (e.g., containers that rely solely on materials or passive mechanical features to maintain a starting temperature).

When an active container is connected to an external power supply, the external power supply may directly power the active systems of the active container, may charge the battery of the active container, or both. By connecting to external power supplies at one or more storage points along a shipment cycle, the size and weight of a battery needed to power the active container throughout the entire shipment cycle may be reduced, thereby reducing the total weight of the active container and increasing the space available for storing goods.

Also disclosed are active containers with data bridging that use one or more short range data transmission capabilities, such as Wi-Fi, Bluetooth, or a physical data connection, to connect to another system or device that is located proximately to the active container and that offers one or more data streams that may be used by the active container to produce analytics on its location, status of various systems, status of stored goods, and other information. This could include connecting with a local wireless network while stored in a warehouse in order to receive location data and exchange data with systems over the internet, connecting with a courier vehicles GPS navigation and cellular data service via Bluetooth, connecting with an airplane's local wireless network to exchange data with systems over the internet, and other similar bridging techniques and circumstances.

By using data streams made available by such bridging techniques, an active container may disable independent GPS or cellular data systems to conserve power, or may continue to receive and exchange data with data streams when independent connection is unavailable (e.g., the active container does not have equipment allowing for independent connection or the active container is stored in an area where the connection is impossible) or prohibited for any reason. Operating in this manner, an active container may reduce or eliminate the number and duration of blind spots (i.e., points during transit where the active container is unable to receive or exchange information with data streams) that it experiences during a shipment cycle.

The disclosed descriptions of in-transit power and data bridging may be implemented in active containers separately, or in combination, as may be desired for a particular implementation.

I. EXEMPLARY IN-TRANSIT CHARGING SYSTEM AND METHODS

Turning now to the figures, FIG. 1 shows a conventional shipment cycle (100) for active containers. In such a cycle, the active container may have its battery charged to full or near full capacity at its origin (102), which may be a warehouse or packing center that produces the goods that are being shipped, or that specializes in preparing active containers for shipment. When the active container is packed and begins its transit it will be using a battery (103) for power to maintain any active systems that it possesses, which may include temperature management systems, humidity management systems, or active vibration management systems. The container may be moved from its storage point in the warehouse (102), which may be a shelf or packaging area for example, and placed in a ground vehicle (104) for transit to an airport warehouse (106), relying on the battery (103) for power throughout this period of time. After some period of time at an airport warehouse (106), the container may be placed on an airplane (108) and be flown to another location, where it may be removed from the airplane (108) and placed in another airport warehouse (110) for some period of time. A ground vehicle (104) may then arrive at the airport warehouse (110) to retrieve one or more containers and transport them to a distribution center (112), where they may be placed on another ground vehicle (104) for delivery to a final destination such as a home or business (114). As can be seen in FIG. 1, at each point along this transit the active container is relying on the battery (103) to power any necessary active features.

With the number of steps in the exemplary shipment cycle, it can be seen that there are many opportunities for delays if a package is misplaced at a storage area (106, 110, 112), or if a ground vehicle (104) or airplane (108) has a mechanical issue, or is otherwise delayed by weather, customs clearance or other non-controllable or unanticipated event. As a result, there may be little room for error with some shipments, and external forces like a mechanical failure, extreme temperatures, or other delay may result in complete discharge of the battery which can cause the goods to become damaged or unusable. While larger batteries can provide a larger initial charge to safeguard against some level of unexpected delay or power need, as previously discussed, batteries do not scale well for transit applications and there is a point where sufficiently sized batteries will not leave sufficient room for goods within the active container.

Figure 2:
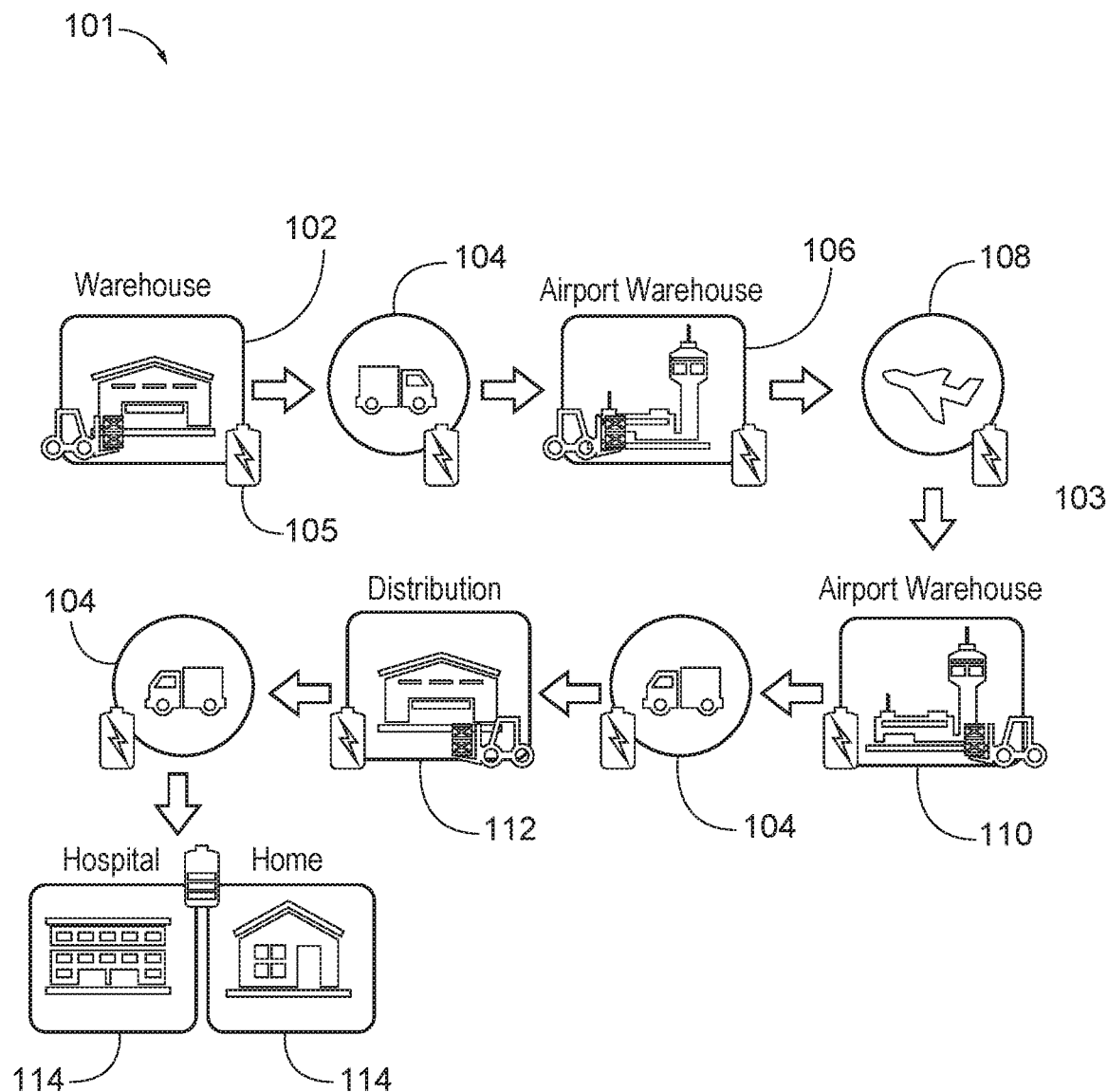
FIG. 2 is a flow diagram showing an exemplary improved active container transit using a system for providing in-transit power sources.
Figure 6:
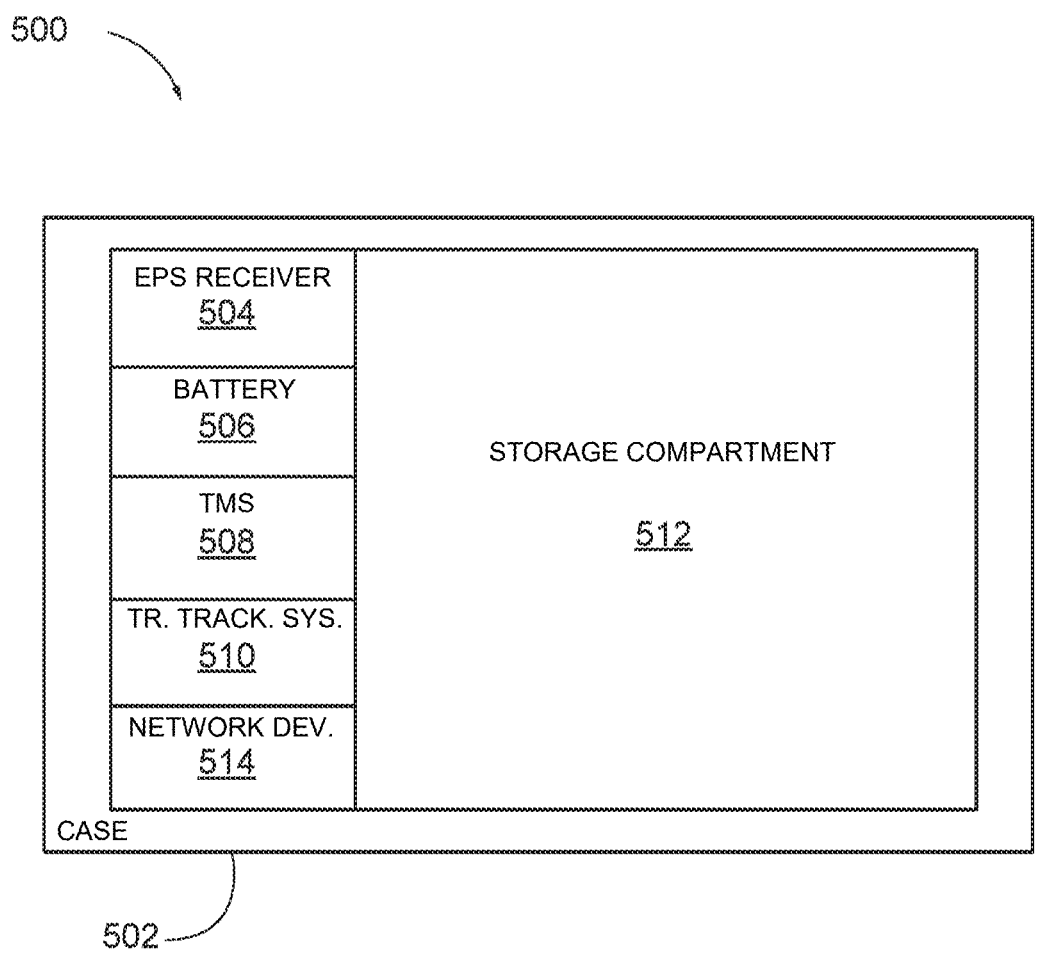
FIG. 6 is a schematic diagram of an exemplary active container.

FIG. 2 is a flow diagram showing an exemplary active container shipment cycle (101) that uses a system for providing in-transit power sources to an active container (500) such as that shown in FIG. 6. As shown in FIG. 2, while the individual steps of the shipment cycle are similar, including an initial charging of a battery at an origin point such as a warehouse (102), transportation by several ground vehicles (104) and an airplane (108), and storage in various locations (106, 110, 112), this process differs in that at several stages of the shipment cycle the active container (500) may be using an in-transit power supply, which may also be referred to as an external power supply or "EPS" (105), rather than relying on a battery, which may be referred to as an internal power supply or "IPS" (103) at all stages. When an EPS (105) is present during transit, the active container (500) may power its active systems from the EPS (105), may charge its IPS (103) from the EPS (105), or both. As shown in the exemplary shipment cycle of FIG. 2, the active container (500) will have an EPS available at one or more of the following exemplary locations: (105) at the origin warehouse (105), during transit in the one or more ground vehicles (104), at the airport warehouses (106), or at the distribution center (112).

This ability to reduce reliance on the IPS (103) at several stages of the cycle or to recharge the IPS (103) mid-cycle means that a smaller IPS (103) may be used in the active container (500) while maintaining equivalent functionality as a larger IPS (103), thereby reducing the container's overall weight and increasing the availability of room for goods within the container without compromising the safety of the goods in transit. For example, suppose that the transit shown in FIG. 1 is predicted to be 100 hours in length from origin to destination, a IPS (103) of FIG. 1 should allow for a minimum of 100 hours of operation of a temperature management system to keep the temperature of goods within an acceptable range based upon the predicted ambient temperatures during transit. Consider now FIG. 2, and suppose that the duration of transit is 100 hours, but that only 10 hours of that is spent on an airplane (108) where an EPS (105) may be unavailable. In this case, the battery should allow for a minimum of 10 hours of operation of a temperature management system to keep the temperature of the goods within an acceptable range based upon the predicted temperature of the airplane (108) cargo area. While the minimum charges described above may not be ideal they do serve as a useful comparison between FIG. 1 and FIG. 2, and indicate that in some situations the maximum charge that an IPS (103) is required to hold may be reduced by 90% by using the system described herein. It should be noted that implementation of such a system as that shown in FIG. 2 may require certain changes or features be present in both active containers used with such a system, as well as to storage areas of such a system, as will be described in further detail below.

Figure 3:
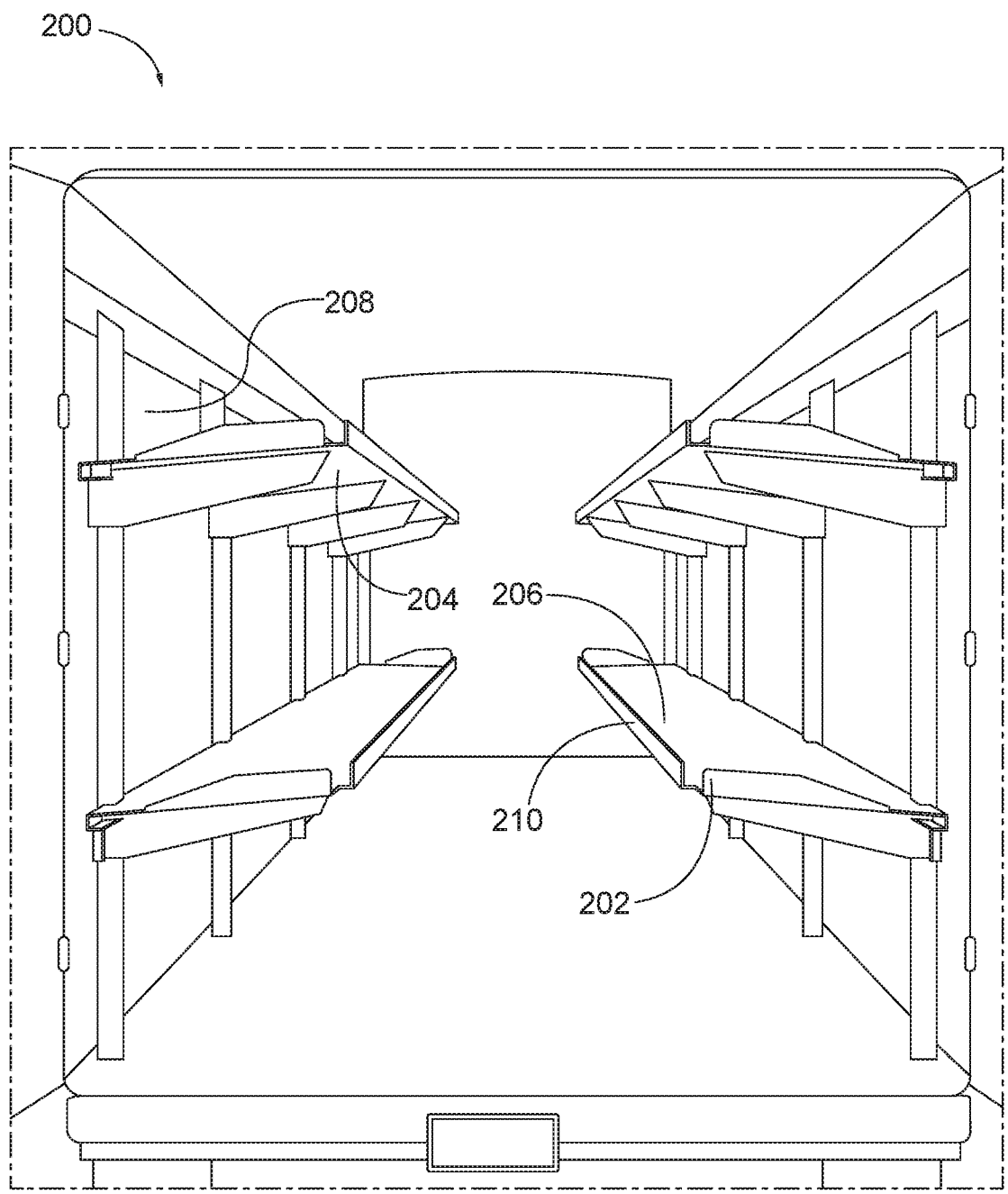
FIG. 3 is a side elevation view of an exemplary set of vehicle shelves that may be used to store active containers.
Figure 4:
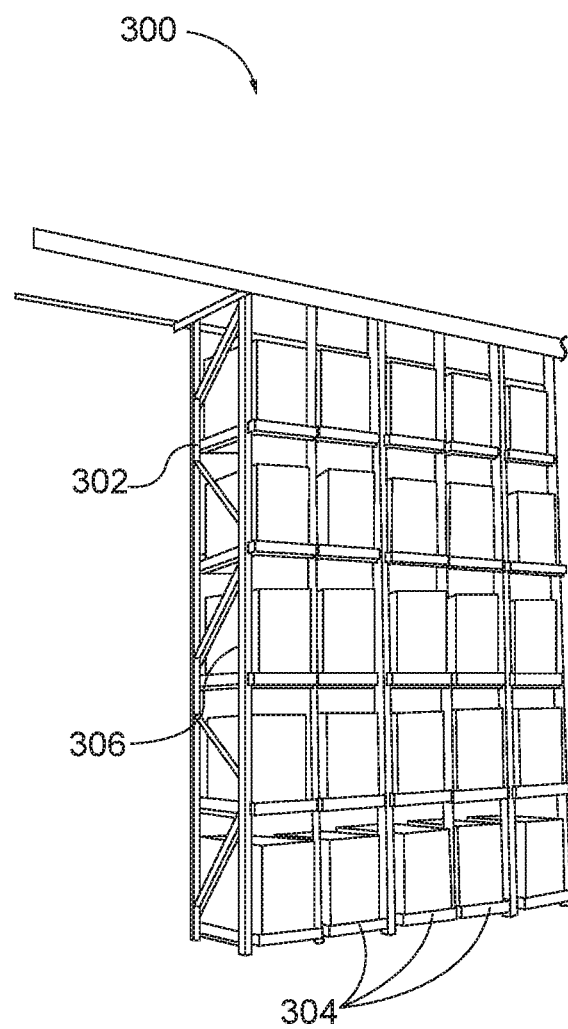
FIG. 4 is a front perspective view of an exemplary set of warehouse shelves that may be used to store active containers.
Figure 5:
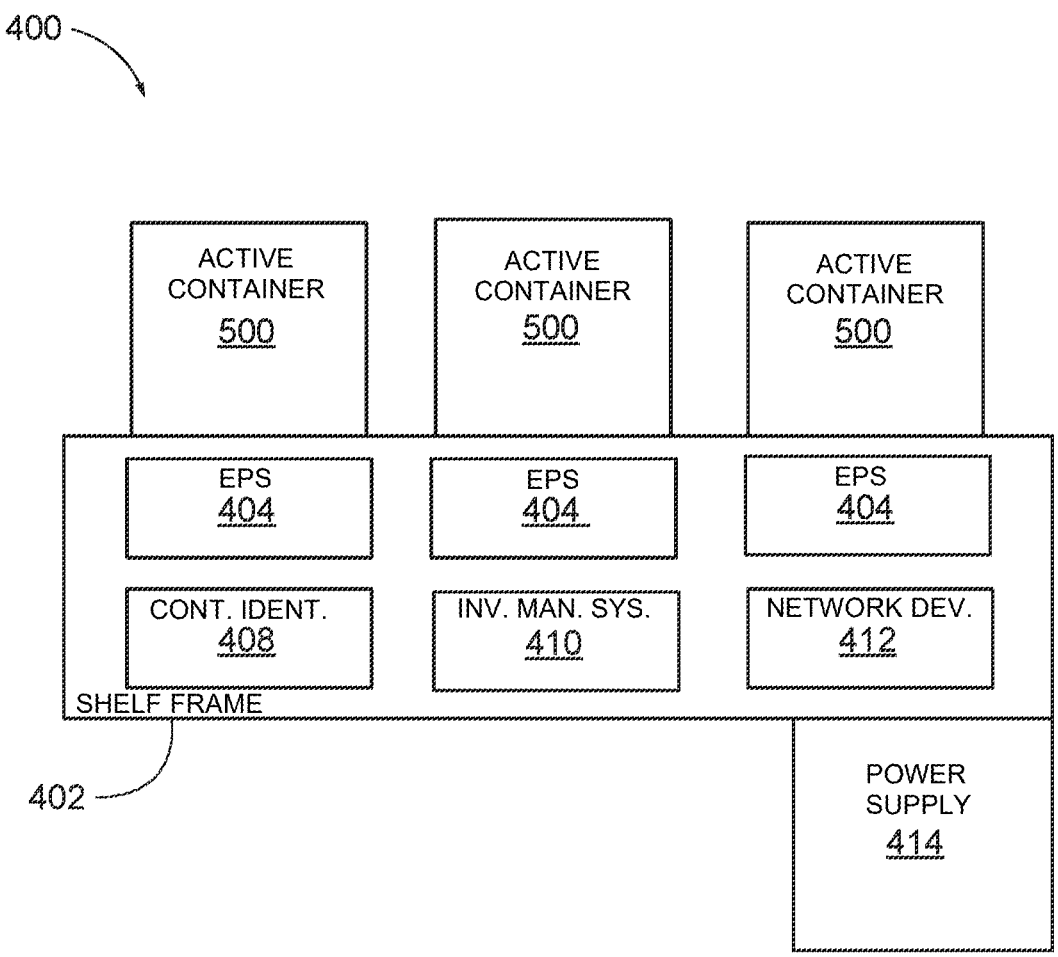
FIG. 5 is a schematic diagram of an exemplary active shelf for storing an active container.

FIG. 3 shows a side elevation view of an exemplary set of vehicle shelves (200), while FIG. 4 shows a front perspective view of an exemplary set of warehouse shelves (300), which each may be fitted with an active shelf system (400) such as that shown in FIG. 5 in order to provide an EPS (105) to an active container (500) stored thereon. Referring to FIG. 3, a set of vehicle shelves (200) that may be configured to provide an EPS (105) may include one or more shelves (202) of length and width to hold one or more active containers (500), each shelf (202) of the set of shelves (200) having an underside (204), a surface (206) upon which an active container (500) may be placed, a rear wall (208) which an active container (500) may rest against, and a lip (210) at a front edge of the shelf that may prevent an active container (500) from shifting or falling from the shelf. A set of warehouse shelves (300) that may be configured to provide an EPS (105) may include one or more shelves (302) of length and width to hold one or more active containers (500), each shelf (302) of the set of shelves (300) having a surface (304) for holding an active container (500), the surface (304) having an underside (not pictured), and a frame (306) that holds the shelves (302) and active containers (500) in place.

FIG. 5 is a schematic diagram of an exemplary active shelf (400) for storing an active container (500), which may be implemented as a shelf (202, 302) in one of the shelving systems (200, 300) shown in FIGS. 3 and 4. A shelf frame (402) runs horizontally and may hold one or more active containers (500). The shelf frame (402) provides places such as mounting points or enclosures where additional components of an active shelf (400) may be attached to or installed within. Additional components may include EPSs (404), container identifiers (408), an inventory management system (410), a network device (412), and a power supply (414). Each EPS (404) is capable of providing external power to one or more active containers (500), with power for each individual EPS coming from the power supply (414). An EPS (404) may delivery power to an active container (500) via a direct connection such as a cable or docking connection, or via a wireless power delivery method such as inductive coupling, capacitive coupling, magnetodynamic coupling, laser, or other similar near-field and far-field technologies for wireless power transfer. As seen in FIG. 6, each active container (500) will have an EPS receiver (504) that is configured to receive power from an EPS (404), with the specific form of such components being based upon the particular form of power delivery.

For example, where the EPS (404) delivers power via a cable or other mechanical connection, the EPS receiver (504) could be a corresponding cable connection or mechanical connection, so that when the active container (500) is placed on a shelf having an EPS, the cable could be manually connected as a separate action, or as part of the action of placing the active container (500) (e.g., where the act of placing the container causes the EPS receiver (504) to dock or socket into an EPS (404) due to their respective placement on the shelf and container). Where the EPS (404) delivers power wirelessly, such as where it is an inductive, capacitive, magnetodynamic, or optical transmitter, the EPS receiver (504) could be an inductive, capacitive, magnetodynamic, or optical receiver. Wireless EPSs (404) may automatically begin to provide power to an active container (500) as the result of the act of placing the active container (500) on a shelf having a wireless EPS. For example, in an implementation where inductive technology is used, an active container would include an EPS receiver (504) such as an inductive strip or plate on the bottom or side of the container (500), and an EPS enabled shelf (202, 302) would have an inductive transmitter strip or plate installed as an EPS (404) on a wall (208), underside (204) surface (206), or frame (306) of the shelf (202, 302), such that when the active container (500) is placed on the shelf (202, 302) it comes to rest within a distance of the EPS (404) where inductive transmitting of power may automatically begin. The physical shape and characteristics of the container, shelf, or both may be selected to ensure positioning and distance of the container and shelf relative to each other to allow for inductive transfer, and may include the use of rails, notches, tabs, or other physical features that can guide or interlock to ensure proper placement as the active container (500) is placed on the shelf (202, 302).

Other features of an active shelf may include inventory management features including container identifiers (408) and an inventory management system (410). The container identifier (408) may be, for example, a physical data connection such as a cable or other mechanical connection, which may be part of a cable or connection that also allows for connection of an EPS (404), or may be a device for wirelessly capturing data such as an optical scanner or wireless transceiver such as Wi-Fi, Bluetooth, RFID, or NFC. The container identifier (408) may be placed within or near an active shelf (400), such as on wall (208) or frame (306), and will be configured to identify an active container (500) as it is placed on the active shelf (400) or connected to the EPS (404). For example, this could include using a radio transceiver to read a unique RFID number from a chip placed on an active container.

This identification may then be passed to an inventory management system (410) and stored so that various details of the active containers (500) transit may be determined. This could include, for example, the length of time the container is at a particular location, the temperature for that period of time, the containers estimated or actual battery charge (actual battery charge may be available in systems where identification occurs via a dynamic data stream such as NFC or Bluetooth for example), time spent powered by EPS (105), time spent powered by IPS (103), and other information. Such information may be stored locally on the inventory management system (410), which may be a processor and memory, a single-board computer, or other computing device that may be installed within or nearby an active shelf (404). Such information may also be transmitted to remote locations and servers via a network device (412) installed within or nearby an active shelf (404), which could include, for example, a wireless network device, Bluetooth device, cellular data device, or other wireless data transmitting device. For example, a cellular data network device (412) may regularly transmit data from the inventory management system (410) to a cloud-based system or remote server so that data from multiple active shelf systems (400) that is associated with a single active container (500) may be aggregated and used to determine details of the transit of the container. In another example, the network device (412) may be a Bluetooth or other short range wireless connection that may use a long range wireless data connection available via a driver's mobile phone or a ground vehicles (104) built in data connection to accomplish such communications.

The power supply (414) that provides power to each individual EPS (404) may be, for example, high capacity batteries used in an electric ground vehicle (104), current supplied from a generator or alternator of a ground vehicle (104), current supplied from solar panels installed on the exterior of a ground vehicle (104) or warehouse (106), or standard electrical current supplied by outlets or electrical service in a warehouse (106).

Power supplied to an active container may be drawn and used by the active container (500) on demand, or may be used to recharge an IPS (103), or both, depending upon the characteristics and features of a particular active container (500). FIG. 6 shows a schematic diagram of an exemplary active container (500) having a number of exemplary features. The active container (500) has a case (502) comprising a storage compartment (512), an EPS receiver (504), a battery (506), a temperature management system or "TMS" (508), a transit tracking system (510), and a network device (514). The case (502) may be durable and insulated, and may have physical connections for connecting to an EPS (404) via an EPS receiver (504), or, in the case of wireless transmission of power, may have an externally mounted EPS receiver (504) or a portion of the case (502) that is constructed of materials that allow for wireless transmission of power, data, or both through that section of the case (502). A storage compartment (512) within the case (502) may be accessed by a door or lid for example, and is used to store goods that are shipped within the active container (500). The battery (506) serves as the IPS (103) for active systems of the active container (500), and may be reduced in size and capacity relative to a conventional system due to the availability of an EPS (105) during one or more portions of the shipment cycle (200).

Active systems of the active container (500) may include the temperature management system (508), transit tracking system (510), climate control, active vibration control, or other features. In the container of FIG. 6, a TMS (508) may actively cool and heat air or materials that are circulated through the storage compartment (512) or in contact with the storage compartment (512) in response to temperature sensor data generated by a sensor of the TMS (508) in order to regulate the temperature of goods in the storage compartment (512). A TMS (508) may use a variety of conventional heating and cooling devices, including compressor cooling, stored energy in both heating and cooling plates, resistive heating elements, solid state heating and cooling such as thermoelectric cooling, phase change heating and cooling and other similar technologies. The TMS (508) will typically operate non-stop to maintain desired temperature ranges, though it may be configured to deactivate under certain conditions such as when an active container (500) is stored in an airplane (108) cargo hold or other area where there may be restrictions on the use of systems for electrical heating, cooling, or circulation of volumes of air.

A transit tracking system (510) may be used to track and store the location of the active container (500) via GPS, the temperature and humidity of a storage compartment (512) during transit, motion and acceleration of the container (500) during transit, usage, charging, and status of the battery (506) during transit, usage and availability of an EPS (404) during transit, and other information generated during transit that may be useful in determining the outcome or present status of transit. Such information may be stored on the transit tracking system (510) and manually accessed, or may be transmitted to one or more remote systems or devices via a network device (514) such as a cellular data, Wi-Fi, Bluetooth, or NFC transceiver, or another communication transceiver. Such information may be used, for example, to determine if goods were stored within acceptable temperature ranges at all times during transit, if any abnormal shocks or movements of a container may have damaged the goods in, or other similar determinations. When such information is available in real-time, it may be used to intervene in a transit and reduce or prevent the risk of damage to goods within an active container (500). For example, where a TMS (508) generates data indicating that a battery (506) only has sufficient charge for five more hours of temperature management, a transit tracking device (510) may report such information to a remote server via a network device (514). At a remote server, a determination may be made by a person or software application to expedite delivery of the container so that it arrives before the battery (506) is depleted, or to delay its transit at a warehouse (106) where an EPS (105) is available and may be used to recharge the battery (506) before transit continues. Other examples of actions that may be taken in response to real time data from an active container (500) will be apparent to one of ordinary skill in the art in light of the disclosure herein.

Figure 7:
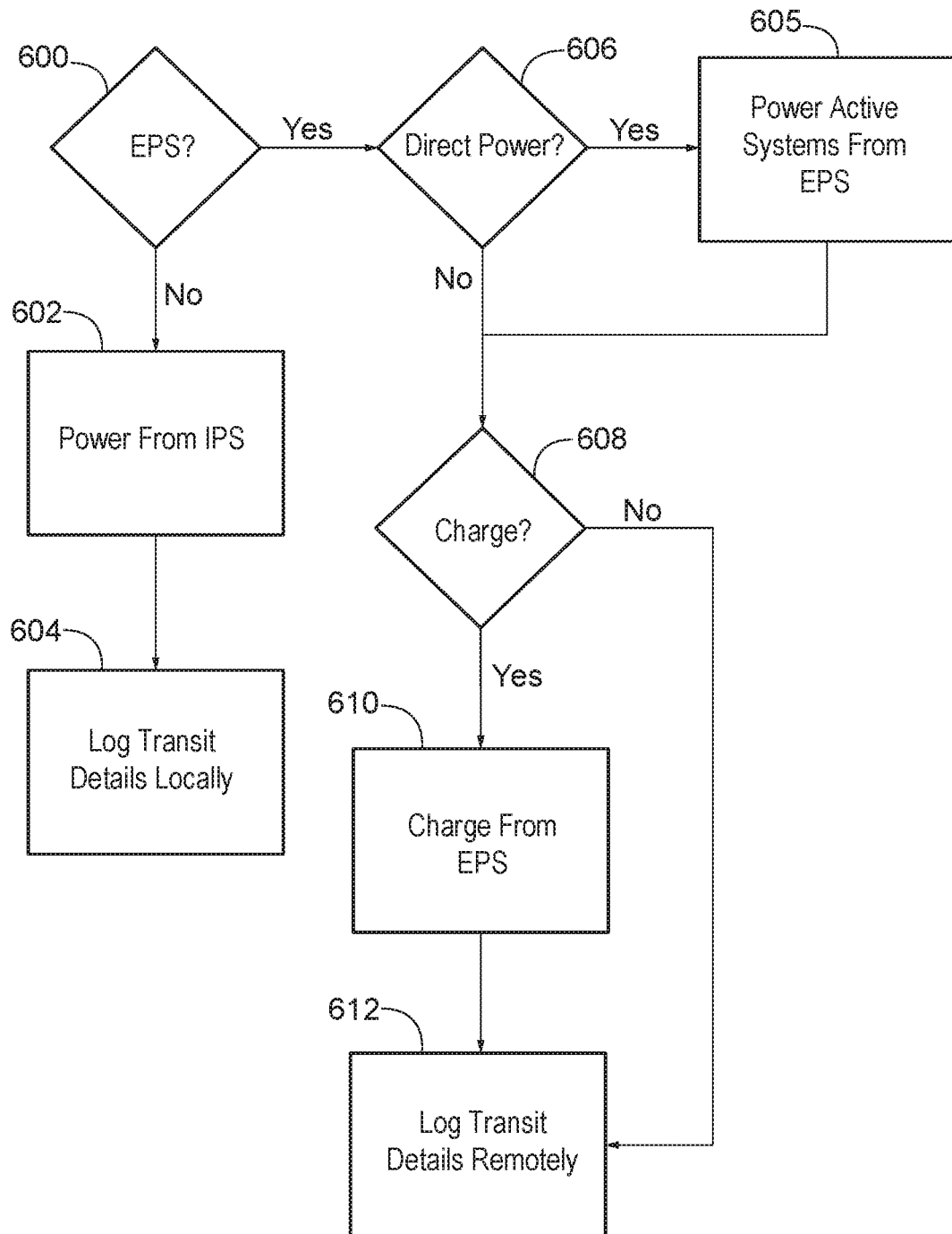
FIG. 7 is a flowchart of a set of steps that a system could perform to provide power and other functionality to an active container.

FIG. 7 is a flowchart of a set of steps that an in-transit power system could perform to provide power and other functionality to an active container. When an active container (500) is placed on a shelf (202, 302), whether in a vehicle (104) or warehouse (106), if an EPS is not present (602) the active container will continue to power (602) any active systems via an IPS (103) such as a battery (506). If present, any transit information being produced by a transit tracking system (510) will continue to be stored locally (604). When an EPS is available (600), the EPS may provide direct power (606) to operate one or more active systems (605) of the active container (500). This could include, for example, powering the active container's (500) TMS (508) and other systems directly to reduce or negate their draw from the battery (506). However, in some cases the EPS, the active container (500), or both may not be configured to provide direct power (606) to active systems, or directly powering the active systems may be otherwise undesirable. In cases where the system is not configured to provide direct power (606), the EPS may be configured to provide a charge to the battery (608), which will receive a charge from the EPS (610) while simultaneously continuing to power the active systems. In this manner, the EPS may power the active systems indirectly, which may reduce the complexity or necessity of additional equipment that may be required to allow for the EPS to directly power the active systems.

It should also be understood that in some configurations the EPS and active container (500) may be configured for both direct power (606) to operate the active systems from the EPS (605) while also providing (608) power to charge the battery (506) from the EPS. While power output of the EPS may be higher in such a configuration, it may be desirable in situations where a goal is to maximize the charge that a battery (506) receives while connected to an EPS. While connected to an EPS as described above, implementations having the capability to transmit data to remote servers may remotely log (612) transit details when an active shelf system (400) with network capabilities is available.

II. EXEMPLARY ACTIVE CONTAINER WITH DATA BRIDGING AND METHODS

Figure 8:
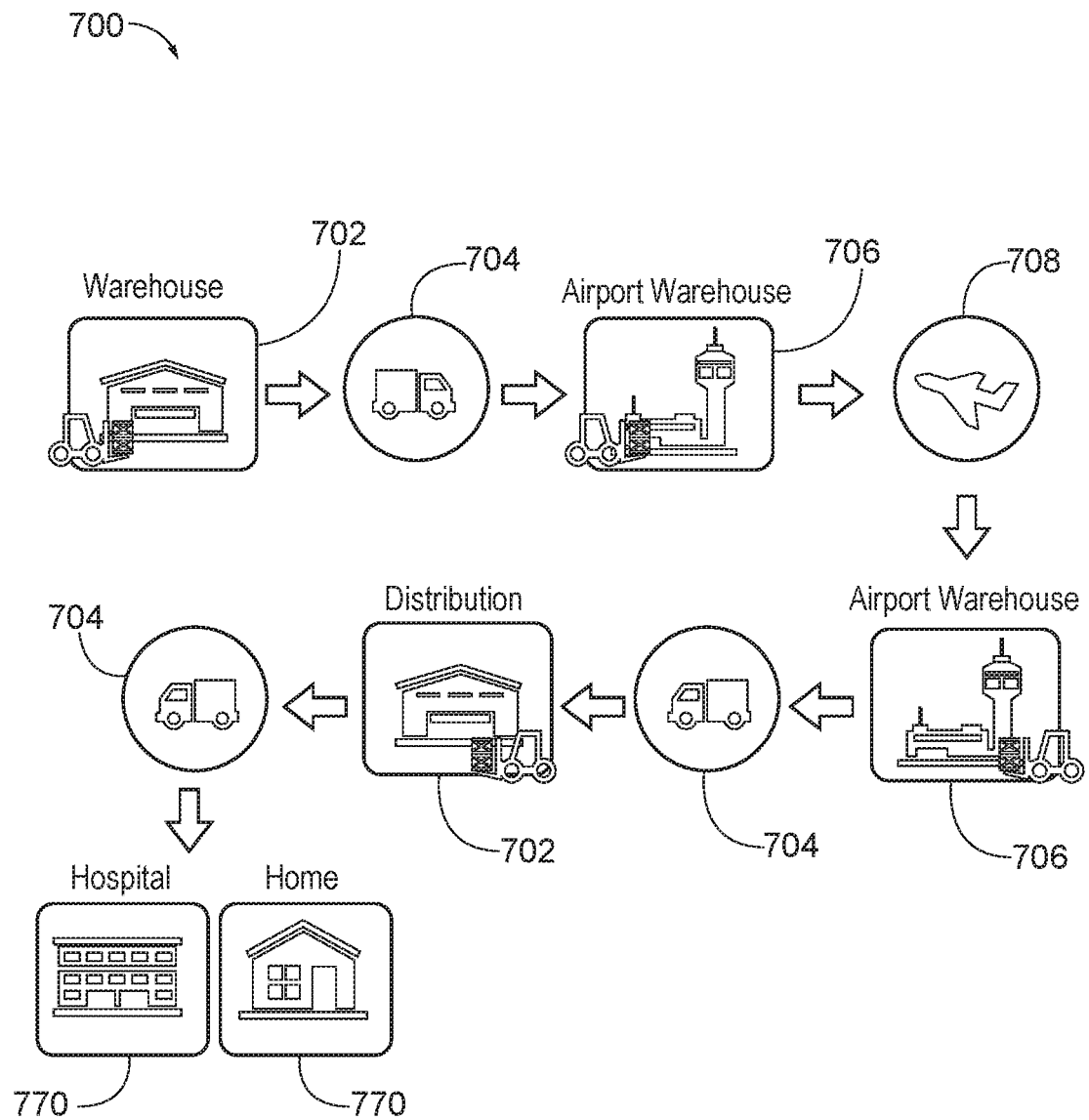
FIG. 8 is a flow diagram of an exemplary shipment cycle for an active container.
Figure 10:
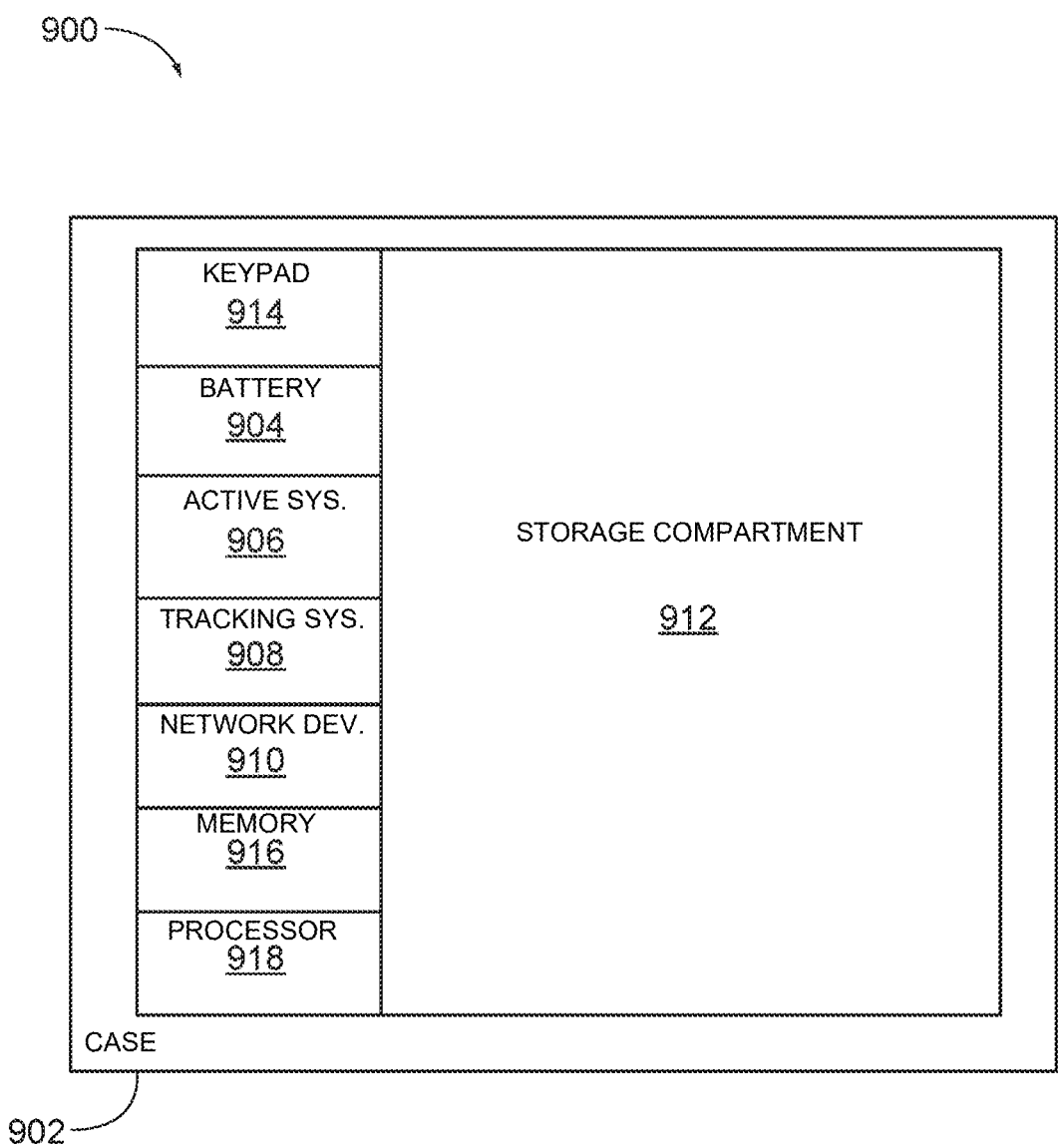
FIG. 10 is a schematic diagram of an exemplary active container.

Turning now to the figures, FIG. 8 shows a flow diagram of an exemplary shipment cycle (700) that an active container (900), such as that shown in FIG. 10, may transit through. Active containers (900) may be used in a variety of context, and could include, for example, reusable containers owned by a party that sends or receives them, containers with limited reusability that are purchased and used for one or more shipments, and containers that may be rented or leased from a provider and used by a party that sends or receives them. During a shipment cycle an active container (900) may be stored in a variety of locations, including storage and distribution warehouses (702), courier vehicles (704), airport warehouses (706), airplanes (708), all before arriving at a destination (770). Each of these locations may have different characteristics and storage conditions that may impact an active container's (900) ability to track its location, report its location, or perform other tasks relating to inbound and outbound communications.

For example, some warehouses (702) may be constructed from concrete, metal, or other materials that alone or in combination with each other can block or reduce the quality of wireless data transmissions entering or exiting the interior of the structure. Courier vehicles (704) may also be constructed of metal or other materials that may passively block wireless transmissions to and from storage areas, and in some cases may even be purposefully shielded against such transmissions through the use of other passive or active wireless transmission blocking techniques. As with previous examples, airport warehouses (706) and airplanes (708) may be resistant to wireless transmissions due to materials or active shielding, and may additionally be regulated by statute or agreement prohibiting even unsuccessful attempts to wirelessly transmit data or even requiring that any device that is capable of wireless transmissions be completely powered off.

Active containers (900) can include devices that send or receive data. This could include location tracking systems (908) that receive GPS data from a satellite and provide that location data to remote servers and devices in the form of tracking information, keypads (914) and security features that may remotely lock or unlock an active container (900) in response to communications from a remote server, battery (904) management systems that report a battery status and charge to remote servers, and other similar features.

For example, a tracking system (908) that can receive GPS or other location data in order to determine a present location, which may then be locally stored on a memory throughout a trip. Such information may be used to later recreate the path taken during a shipment, or may be used to enable or disable various features of the active container (900) based on a geographic location of the container. This could include enabling or disabling certain types of wireless transmission when the active container (900) is in or near an airport, automatically locking the active container (900) when it is in certain storage areas or outside of a certain predicted route, or other similar actions. When the tracking system (908) is unable to independently resolve the active container's (900) location, because receipt of GPS data it is blocked, prohibited, or disabled to conserve power, such features may be unavailable.

As another example, some active containers (900) may regularly exchange data with remote systems. This could include reporting a present location to allow for real-time tracking of a shipment, reporting the temperature or humidity of goods stored within a storage compartment (912), reporting a battery (904) charge level, reporting attempts to access the container via a keypad (914), reporting the status of one or more active systems (906), which may include temperature and humidity control systems, and other information which may desirably be transmitted to a remote server and aggregated or otherwise used. Containers that exchange data with remote systems could include, for example, containers having active temperature control systems (e.g., integrated compressors or thermoelectric devices that can produce heat or cold and maintain or change a current temperature), containers having semi-active temperature control systems (e.g., containers that do not produce heat or cold during transit, but have materials and devices that help it to retain and maintain a starting temperature such as eutectic plates and circulation fans), and passively temperature controlled containers (e.g., containers that rely solely on materials or passive mechanical features to maintain a starting temperature).

While the specific contents of the data that is produced and exchanged with containers having active, semi-active, and passive temperature control systems will vary, the teachings herein may be applied to each. Additionally, it should be understood that the active container (900) may have a controller such as a processor (918) configured to control one or more of the active systems (906), the tracking system (908), the communication devices (910), or other devices or components of the active container (900). The processor (918) may be a single processor operable to control or usable by one or more components of the active container (900) or may be multiple processors each accessible by or dedicated to one or more components. For example, in some implementations the processor (918) may comprise a main processor operable to control and exchange information with the tracking system (908) and the communication devices (910) and may also comprise a processor dedicated to or contained within the tracking system and configured to receive and interpret positioning signals, trigger events related to positioning signals, and other similar tasks. Other similar variations and implementations will be apparent to one of ordinary skill in the art in light of the disclosure herein.

Exchanges of information may be made via one or more communication or network devices (910) of the active container (900), which may include devices independently capable of communications with a remote server such as a cellular data modem, but may also include devices capable of bridging to other locally available data connections, such as Bluetooth, Wi-Fi, or other similar short range wireless technologies that may be installed within or mounted to the exterior of a case (902) of the active container (900), or wired communication options such as USB, Ethernet, or broadband over power. When the network devices (910) are unable to communicate with remote systems, because the communications are blocked, prohibited, or disabled to conserve power, such features may be unavailable.

An inability to receive or send certain types of data, whether because transmissions are fully or partially blocked, or because a device is shut off or prohibited from use, may impact one or more of the above described features of an active container (900). Even where full and independent connectivity is possible, it may be desirable to limit the use of such connectivity to devices that consume little power (e.g., low energy Bluetooth rather than long range cellular data) when possible, in order to conserve an active container's (900) limited battery (904) charge.

While independent communication with a remote server or device via a GPS receiver or cellular data modem may at times be prevented or prohibited, short-range wireless communications via Bluetooth, Wi-Fi or other technologies may avoid such prohibitions or may operate normally within a warehouse (702), courier vehicle (704), or airplane (708) rather than being blocked by a metal or concrete exterior surface. Establishing a local connection to a device that is capable of connection to a remote server effectively allows an active container (900) to bridge and use that data stream to maintain any features that rely on connection with a remote device when independent connection is unavailable or undesirable.

Figure 9:
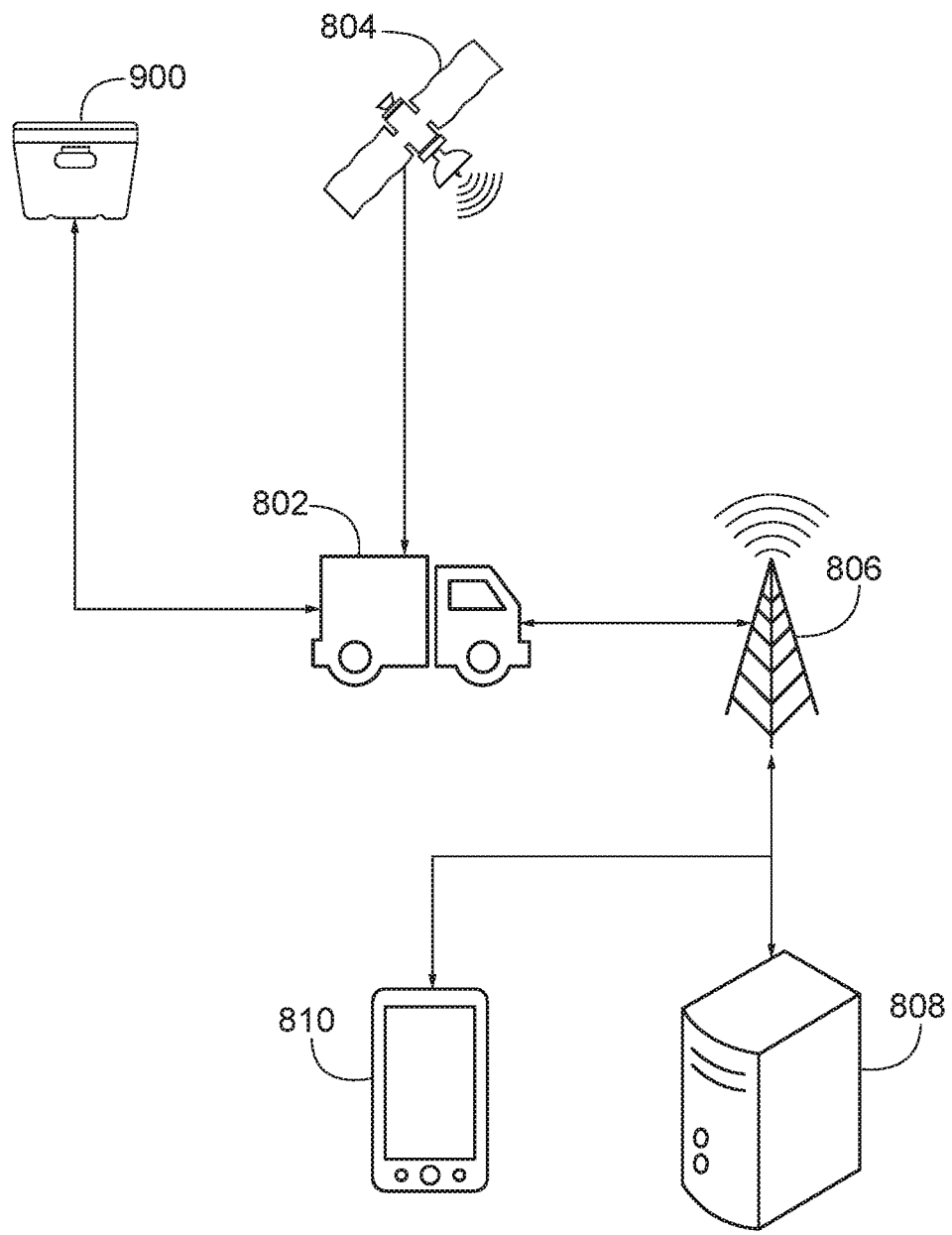
FIG. 9 is a diagram of an exemplary system for active container data bridging.

As an example, FIG. 9 shows a diagram of a system capable of data bridging in order to maintain transmission and receipt of various data when wireless transmissions are prevented or prohibited. In the shown example, a bridge provider (802) may be, for example, a warehouse (702), courier vehicle (704), airplane (708), or other place that an active container (900) may be stored during a shipment cycle, and that also has access to one or more data streams needed by the active container (900), such as GPS data (804) or wide area network internet connectivity (806) via a cellular data modem, which may allow communication with remote devices such as a server (808) or mobile device (810). Bridge providers (802) may provide data streams that may be bridged in a variety of ways. For example, in the case of a warehouse (702) or airport warehouse (706), wireless communications from within the warehouse directed at destinations outside of the warehouse (702) may be fully or partially blocked by cement and metal materials used to construct the warehouse (702).

However, computer systems within the warehouse (702) itself may have access to a wide area network (806) via an externally mounted antenna or cable. Receipt of GPS signals may also be unreliable within the warehouse, but a computer system within the warehouse (702) could store information that could be used to determine the warehouse (702) GPS location, or even the GPS location of an active container (900) stored in the warehouse (702). In this example, an active container (900) could use a Wi-Fi, Bluetooth, or other network device (910) to connect to a device or local area network available within the warehouse (702) in order to send and receive information with the warehouse (702) computer system. Establishing such a connection would allow the active container (900) to receive information indicating a current location and allow information, such as a record of its location, a record of the temperature and condition of goods, a battery charge, or other information to be exchanged with a server (808) or mobile device (810). Such information may be used to provide reassurance that the active container (900) will arrive in the expected time and condition, or to intervene if the provided information indicates that the active container (900) has been misplaced, or that an active system (906) or battery (904) has failed or will fail.

In an example where the bridge provider (802) is a courier vehicle (704), and independent communication with a GPS data stream (804) or a wide area network (806) is impossible, prohibited, not desirable, or otherwise unavailable for at least the reasons described above, the courier vehicle (704) itself may have integrated devices capable of receiving a GPS data stream (804) or communicating with a wide area network (806). This is frequently the case with vehicles used for high volume transit of packages and goods both for delivery to retail locations and delivery to homes and businesses, and even many personal vehicles are now equipped with GPS navigation and cellular data modems. Even where such devices are not integrated with a courier vehicle (804), a driver of a vehicle may have a mobile device having such capabilities, such as a mobile phone or a mobile hotspot. Where such capabilities are available, as with previous examples, the active container (900) may use a Wi-Fi, Bluetooth, or other network device (910) to connect to the bridge provider (802) (whether it is an integrated device of a courier vehicle (704) or a device possessed by a driver or occupant) and access GPS data streams (804) and wide area network data stream (806) via the bridge provider (802).

In examples where the bridge provider (802) is an airplane (708) the situation is similar, though airplanes may be more likely to prohibit certain types of wireless transmission. So, for example, Bluetooth or other short range wireless options may be preferred options for bridging, while Wi-Fi, which typically has a longer range, may be prohibited or unavailable. Where an airplane (708) is the bridge provider (802), bridging may only be allowed at certain times during a flight, which may require that the network devices (910) power off when a sensor of the active container (900) such as an accelerometer or altimeter indicates that the airplane (708) is taking off or landing, or when a signal is received from the bridge provider (802) indicating that the network devices (910) should power off. It may also be the case for airplanes (708) or other bridge providers (802) that the network device (900) that is used to connect to the bridge provider (802) is a physical cable or other mechanical connection that is made when the active container (900) is placed at the bridge provider (802). Such a physical cable or other mechanical connection might additionally provide power, heating or cooling ventilation, and other resources that could benefit an active container (900) or allow it to reduce reliance on internal active systems (906) or batteries (904).

Figure 11:
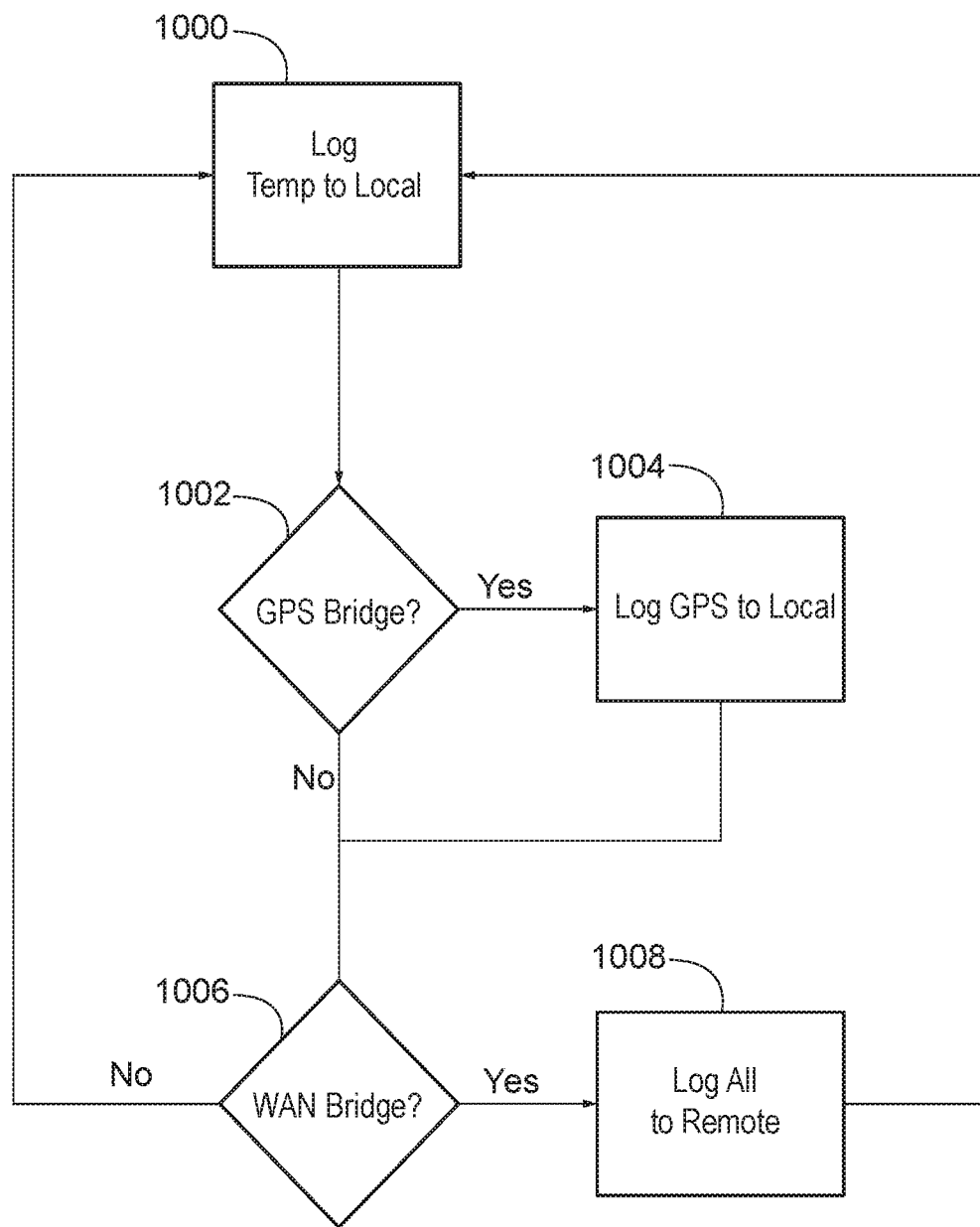
FIG. 11 is a flowchart showing an exemplary set of steps that an active container could perform to bridge available data connections.

Turning now to FIG. 11, that figure shows a flowchart of a set of steps that may be performed by an active container (900) in order to utilize data streams from nearby bridge providers (802). The steps of FIG. 11 assume that the active container (900) does not have independent access to GPS and wide area network data streams, which may include such connectivity being blocked, prohibited, undesirable, or that the active container (900) is not equipped for independent GPS and wide area network access. In such a scenario, the active container (900) will locally log (1000) temperature, humidity, battery status, vibration or motion status, or other characteristics that it is configured to detect and determine to a memory (916) of the active container (900), which, for example, could be a component of the network device (910), tracking system (908), active systems (906), or a standalone memory (916) in communication with other components of the active container (900). Such information could be locally logged (1000) as it is generated, in compressed or encrypted form as may be desirable, and in any form or data structure that will allow the data to later be aggregated, graphed, or otherwise recreated as may be desirable for a particular application. If a GPS bridge becomes available (1002), such as may be the case when the active container (900) is in proximity with a bridge provider (802) that has access to a GPS data stream (804) or that is otherwise configured to provide location data, the active container (900) can connect to the bridge provider (802) via a network device (910) and begin receiving GPS information, or other information that might be available via the bridge provider (802), that can be locally logged (1004) to a memory (916) of the active container (900).

If a wide area network bridge becomes available (1006), such as may be the case when the active container (900) is in proximity with a bridge provider (802) that has access to a wide area network data stream (806), the active container (900) can connect to the bridge provider (802) via a network device (910) to access the wide area network data stream (806). The wide area network data stream (806) may be accessible through, for example, a warehouse (702) broadband internet connection, a courier vehicle (704) or airplane (708) cellular data connection, a mobile phone cellular data connection, or other similar devices or connections. When the active container (900) connects via a WAN bridge (1006), it may begin exchanging information with servers (808) and mobile devices (810), which could include providing information to those devices indicating the active container's (900) location and condition or other information that may be desirably logged (1008) to a remote device. Other types of information that may be logged locally and remotely and uses for that information will be apparent to those of ordinary skill in the art in light of the disclosure herein.

Figure 12:
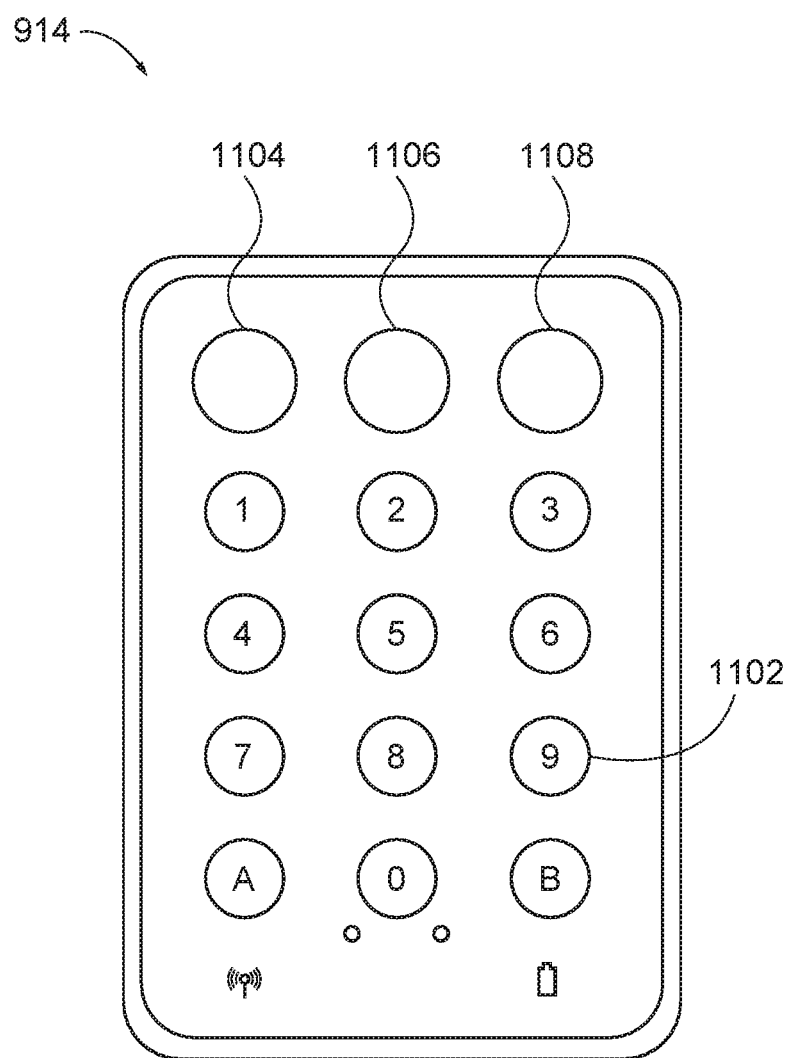
FIG. 12 is a front elevation view of an exemplary keypad of an active container.

One component of the active container (900) that has been previously mentioned is the keypad (914), shown in FIG. 12. The keypad (914) has several features that may operate along with the data bridging capabilities that have been previously described. A set of buttons (1102) may be used by an operator to interact with the active container (900), and may allow a user to, for example, lock, unlock, or change configurations of the active container (900). The keypad may also have one or more indicators, including a critical indicator (1104), a safe indicator (1106), and a caution indicator (1108). The shown indicators (1104, 1106, 1108) may be, for example, light emitting diodes that may be activated to emit varying colors. A critical indicator (1104) may emit a red light to indicate, for example, a critical failure of some aspect of the active container (900) that may impact the usability of the goods stored therein. A safe indicator (1106) may be a light emitting diode capable of emitting, for example, a green light to indicate, for example, that the active container (900) is operating as expected, and that the good stored therein should be in their expected condition. A caution indicator (1108) may be a light emitting diode capable of emitting, for example, an orange or amber light to indicate, for example, that the active container (900) has a low risk error that is unlikely to impact the usability of goods stored therein, but that should be investigated.

Figure 13:
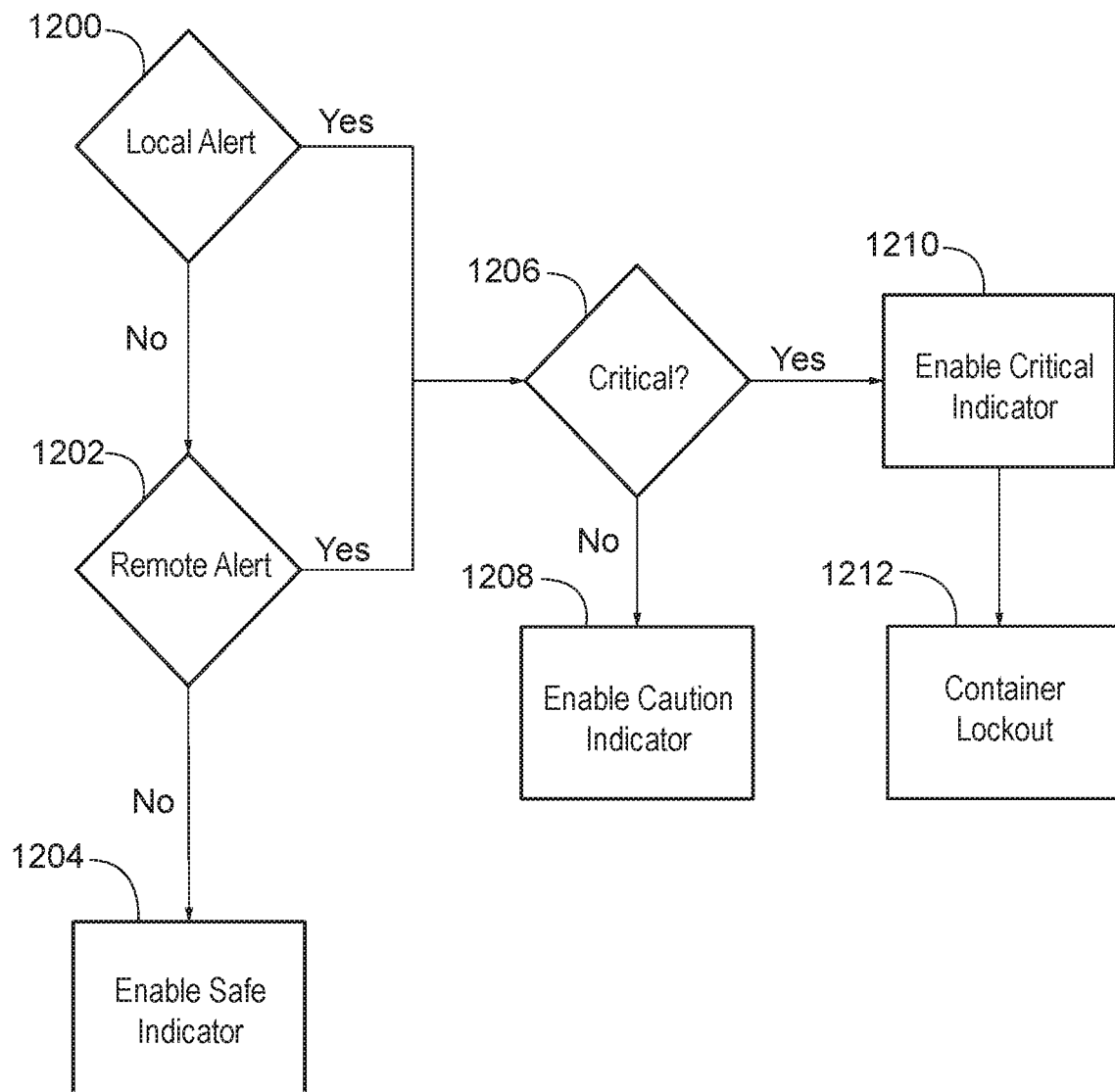
FIG. 13 is a flowchart showing an exemplary set of steps than an active container could perform to provide information on an active container via the exemplary keypad.

One or more indicator lights (1104, 1106, 1108) may be lighted by the active container (900) in some circumstances. FIG. 13 shows a flowchart of an exemplary set of steps that could be performed to light indicator lights of the keypad (914) in one set of circumstances. One or more systems or components of an active container may generate diagnostic messages and alerts during use. This could include, for example, a battery (904) low charge or malfunction, a failure or unpredictable behavior of an active system (906) such as the temperature management system, a temperature or humidity reading from a storage compartment (912) that is outside of the safe storage range for the goods therein, or other similar occurrences may generate local alerts (1200).

Remote alerts may also be generated (1202) when an active container (900) is in communication with a remote system such as a server (808). Remote alerts may occur (1202) when a server (808) or mobile device (810) provides information or instructions to the active container (900) that generate an alert. This could include, for example, an indication from the server (808) that the active container (900) was shipped to the wrong destination, that it contains the wrong goods, that the goods within the container were improperly packed or have been recalled by a manufacturer, that some information provided by the active container (900) indicates that the goods are unusable despite not generating a local alert (1200), or other similar situations where a determination is remotely made that the active container (900) should be placed into a certain alert mode.

Where no local or remote alert exists, or when a previous alert has been cleared or resolved, the keypad (914) safe indicator may be enabled (1204) to provide a visual indicator that the active container (900) is operating as expected and the goods contained therein were properly stored and maintained. After a local or remote alert has been generated, a determination may be made as to whether it is critical (1206) or not. This determination may be made by the system or component generating the alert and included in the electronic signal that generates the alert, may be determined at a remote server (808) and delivered as part of a remote alert, or may be determined by a processor (918) and memory (916) of the active container (900). A determination of whether an alert is critical or not (1206) may depend upon such factors as the goods stored within the storage compartment (912), the nature and severity of the alert, or other factors. For example, one alert may indicate that the temperature at which goods were stored in the active container (900) was 5% above the safe range for a period of 5 minutes. For some goods this may be a critical alert (1206), in which case the critical indicator would be enabled (1210) to visually alert someone that the goods inside should not be used, and may also cause the active container (900) to lockout (1212) and prevent attempts to access the storage compartment (912) via the keypad (914) without an access code or other remote authorization. The same set of circumstances might be determined as non-critical (1206) for different types of goods, in which case the caution indicator would be enabled (1208) to indicate that some abnormality occurred during shipment and further inquiry may be warranted, but that the goods may be accessed and used if necessary.

Other examples of situations which may generate alerts exist. For example, if an active container (900) is reported to be stolen, or if local or remotely available location data indicates that it is located outside of its expected route or was delivered to an incorrect destination, a local or remote alert may be generated (1200, 1202) and deemed to be critical (1206) in order to provide a critical warning indicator (1210) and lockout (1212) so that the contents of the storage compartment (912) are not easily accessed by someone who has mistakenly or maliciously taken possession of the active container (900). Such alerts may be triggered when, for example, an active container (900) disconnects from the bridge provider (802) outside of an expected geofenced area (e.g., where connection with the bridge provider (802) is lost while the active container (900) is more than 100 yards from the expected delivery destination), as this could indicate that the active container (900) was delivered to the wrong area, stolen, or is otherwise off its expected course. In such a circumstance, the keypad (914) may be configured to automatically lockout (1212) based upon being outside of the geofenced delivery area when bridge connection was lost, and may additionally be configured to automatically clear the lockout (1212) when a bridge connection is restored within the geofenced delivery area.

As another example, if a local or remote alert is generated (1200, 1202) indicating that a courier vehicle (704) that the active container (900) was within was involved in a sudden stop or traffic accident, as indicated by information provided from the bridge provider (802) or an accelerometer within the active container (900) for example, a caution light might be enabled (1208) to indicate that the goods are likely usable, but should be closely inspected for physical damage caused by jarring movements. Further examples will be apparent to one of ordinary skill in the art in light of the disclosure herein.

III. EXAMPLES

Example 1

An active container comprising: (a) a storage compartment; (b) a set of active features; (c) a battery configured to provide power to the set of active features; (d) a power supply comprising a power receiver, and configured to: (i) receive power from an external power source when the power receiver is coupled with the external power source, and (ii) recharge the battery when the power receiver is coupled with the external power source, wherein the power receiver is positioned to couple with the external power source when the active container is placed on a surface proximate to the external power source.

Example 2

The active container of Example 1, further comprising a set of placement guides positioned about an exterior of the active container and adapted to guide the active container into a coupling location when the active container is placed on the surface, wherein: (a) the external power source comprises a wireless power source positioned proximately to the coupling location, (b) the power receiver comprises a wireless power receiver, and (c) the wireless power receiver is positioned in the active container so that it automatically wirelessly couples with the wireless power source when the active container is in the coupling location.

Example 3

The active container of one or more of Examples 1 through 2, further comprising a set of placement guides positioned about an exterior of the active container and adapted to guide the active container into a coupling location when the active container is placed on the surface, wherein (a) the external power source comprises a wired power source positioned proximately to the coupling location, (b) the power receiver comprises a wired power receiver, and (c) the wired power receiver is positioned on the active container so that it automatically mechanically connects to and couples with the wired power sourced when the active container is in the coupling location.

Example 4

The active container of one or more of Examples 1 through 3, wherein: (a) the power supply is further configured to provide power to the set of active features when coupled with the external power source, and (b) the battery is further configured to provide power to the set of active features only when the power supply is not coupled with the external power source.

Example 5

The active container of one or more of Examples 1 through 4, wherein a maximum charge capacity of the battery is determined based upon: (a) an anticipated transit of the active container, and (b) whether the active container will be placed on the surface and coupled with the external power source during any portion of the anticipated transit of the active container.

Example 6

The active container of one or more of Examples 1 through 5, wherein the surface is a shelf in a vehicle storage area, and wherein the shelf is adapted to hold the active container in place and maintain the coupling of the active container with the external power source during transit.

Example 7

The active container of one or more of Examples 1 through 6, the set of active features comprising a temperature control system, wherein the storage compartment comprises a sensitive material that must be maintained at a first temperature for a first duration of time, and wherein the battery is adapted to power the temperature control system to maintain the storage compartment at the first temperature for a second duration of time, wherein the second duration of time is less than half the first duration of time.

Example 8

The active container of one or more of Examples 1 through 7, wherein the set of active features comprise: (a) a transit tracking system configured to track and store the location and condition of the active container, and (b) a temperature control system operable to maintain the storage compartment at a set temperature, wherein the temperature control system is further configured to: (i) receive a restricted location signal from the transit tracking system, and (ii) in response to the restricted location signal, disable operation of the temperature control system.

Example 9

The active container of one or more of Examples 1 through 8, further comprising a network device, wherein the set of active features comprise a transit tracking system operable to track and store the location and condition of the active container, wherein the transit tracking system is configured to: (a) store a set of transit data for a period of transit, wherein the set of transit data comprises, throughout the period of transit, a location of the active container, a temperature of the storage compartment, an acceleration of the active container, and a battery status of the battery, and (b) when the active container is coupled with the external power source, connect to a receiver via the network device and transmit the set of transit data to the receiver.

Example 10

The active container of Example 9, wherein the network device is a first wireless transceiver, the receiver is a second wireless transceiver, and the receiver is located proximate to the surface.

Example 11

A system for providing power to a plurality of active containers during transit, the system comprising a set of placement locations, wherein each placement location of the set of placement locations comprises: (a) a structure adapted to selectively hold an active container, and (b) an external power source configured to be coupled with the active container when the active container is placed at the placement location, wherein the set of placement locations comprises a vehicle placement location positioned within a vehicle, and wherein the vehicle contains the plurality of active containers for a portion of the transit.

Example 12

The system of Example 11, wherein: (a) the structure comprises a set of placement guides positioned on the exterior of the structure and adapted to guide the active container into a coupling location when the active container is placed on the structure, and (b) the external power source comprises a power transmitter positioned proximately to the coupling location and configured to automatically couple with a power receiver of the active container when the active container is in the coupling location.

Example 13

The system of Example 12, wherein the power transmitter is configured to provide power to the power receiver wirelessly.

Example 14

The system of one or more of Examples 11 through 13, wherein the set of placement locations comprises a storage placement location positioned within a structure, and wherein the structure contains the plurality of active containers for a portion of the transit.

Example 15

The system of Example 14, wherein the set of placement locations comprises a delivery placement location positioned at a destination of the active container, and wherein the destination receives the active container at the end of the transit.

Example 16

The system of one or more of Examples 11 through 15, further comprising a container identifier operable to receive information identifying the active container when the active container is on the structure, and an inventory management system configured to store data associated with transit of the active container, wherein the inventory management system is configured to: (a) receive an identifier from the container identifier, (b) create a transit record comprising a description of the time and location of the active container while on the structure, and (c) transmit the transit record and the identifier to a remote server and cause the transit record to be associated with a transit history for the active container.

Example 17

The system of one or more of Examples 11 through 16, further comprising a communication device configured to receive a set of transit data from the active container when the active container is on the structure, and an inventory management system configured to: (a) create a transit record comprising a description of the time and location of the active container while on the structure and the set of transit data, and (b) provide the transit record to a remote transit management server.

Example 18

The system of Example 17, wherein the inventory management system is further configured to: (a) determine that a battery of the active container has insufficient power based on the set of transit data, and (b) provide an insufficient battery indication to the remote transit management server, wherein the insufficient battery indication is configured to cause the remote transit management server to alter a transit plan associated with the active container.

Example 19

A system for providing power to an active container during transit, the system comprising: (a) a structure adapted to hold the active container, the structure comprising an external power source; and (b) an active container comprising: (i) a storage compartment; (ii) a temperature management system; (iii) a battery configured to provide power to the temperature management system; and (iv) a power supply comprising a power receiver, the power supply configured to recharge the battery from the external power source when the power receiver is coupled with the external power source; wherein the power receiver is positioned to couple with the external power source when the active container is placed on the structure.

Example 20

The system of Example 19, wherein the active container further comprises a set of placement guides positioned on an exterior of the active container and adapted to guide the active container into a coupling location when the active container is placed on the structure, wherein: (a) the external power source comprises a wireless power source positioned proximately to the coupling location, (b) the power receiver comprises a wireless power receiver, and (c) the wireless power receiver is positioned in the active container so that it automatically couples with the wireless power source when the active container is in the coupling location.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

Example 21

An active container comprising: (a) a storage compartment adapted to store materials during transit; (b) a bridge connection device; (c) a memory operable to store information associated with transit of the active container; and (d) a controller configured to control the operation of the bridge connection device, wherein the controller is further configured to: (i) establish a connection between the bridge connection device and a bridge provider when the bridge connection device detects that the bridge provider is within connectable range of the bridge connection device, (ii) receive a set of transit data from the bridge provider via the bridge connection device, wherein the set of transit data originates from a data stream accessible by the bridge provider, and (iii) store at least a portion of the set of transit data on the memory.

Example 22

The active container of Example 21, further comprising a temperature management system operable to manage the temperature of the storage compartment and a battery configured to power the temperature management system, wherein the data stream is an internet connection, and wherein the controller is further configured to: (a) transmit a set of temperature data from the temperature management system to a remote server via the bridge connection device, wherein the set of temperature data describes a measured temperature of the storage compartment during transit, and (b) transmit a set of battery data to the remote server via the bridge connection device, wherein the set of battery data describes a measured battery charge of the battery during transit.

Example 23

The active container of any of Example 21 through 22, wherein the data stream is output from a global positioning device, and wherein the portion of the set of transit data is a global positioning coordinate.

Example 24

The active container of Example 23, further comprising a tracking system operable to produce global positioning coordinates independently of the data stream.

Example 25

The active container of any of Examples 21 through 24, wherein the bridge connection device is a low energy Bluetooth transceiver, and wherein the bridge provider is positioned with a vehicle adapted to transport the active container.

Example 26

The active container of Example 25, further comprising a wireless device operable to access the data stream directly, and a battery configured to operate the wireless device and the low energy Bluetooth transceiver, wherein: (a) the wireless device consumers more electricity during operation than the low energy Bluetooth Transceiver, and (b) the controller is further configured to disable the wireless device when a connection between the low energy Bluetooth transceiver and the bridge provider has been established.

Example 27

The active container of any of Examples 21 through 26, wherein the controller is further configured to: (a) receive an altitude indicator from a sensor of the active container, (b) determine, based upon the altitude indicator, that the active container is located on an airplane during a communication restricted portion of a flight, and (c) disable a set of restricted devices during the communication restricted portion of the flight, wherein the bridge connection device is within the set of restricted devices.

Example 28

The active container of Example 27, further comprising a wired bridge connection device, wherein the controller is further configured to: (a) when the set of restricted devices is disabled, establish a connection between the wired bridge connection device and the bridge provider, (b) receive the set of transit data from the bridge provider via the wired bridge connection device, wherein the set of transit data originates, and (c) transmit a set of local transit data via the bridge provider to a remote server.

Example 29

The active container of any of Examples 21 through 28, further comprising a keypad positioned on the exterior of the active container and an automatic lock configured to selectively prevent or allow access to the storage compartment, the keypad comprising a user input device and an alert indicator, wherein the controller is further configured to: (a) determine whether an alert condition exists based upon the set of transit data, (b) when the alert condition exists, provide an alert indication via the alert indicator and, when the alert condition is critical, operate the automatic lock to prevent access to the storage compartment, (c) receive a set of input from the user input device, (d) determine whether the set of input is valid based upon the portion of the set of transit data, and (e) when the set of input is valid and when the alert condition is not a critical alert condition, operate the automatic lock to allow access to the storage compartment.

Example 30

The active container of any of Examples 21 through 29, further comprising an automatic lock configured to selectively prevent or allow access to the storage compartment, wherein the controller is further configured to: (a) determine a current location of the active container based upon the portion of the set of transit data, (b) when the connection between the bridge connection device and the bridge provider is lost, access a set of geofence data on the memory and determine whether the current location is within the set of geofence data, and (c) when the current location is outside of the set of geofence data, operate the automatic lock to prevent access to the storage compartment.

Example 31

A method for bridging an active container to a bridge provider, the method comprising: (a) placing the active container in a vehicle comprising the bridge provider, (b) connecting a bridge connection device of the active container to the bridge provider, wherein connecting the bridge connection device occurs automatically based at least in part on the bridge connection device being within a threshold distance of the bridge provider, (c) receiving, at a controller of the active container, a set of transit data from the bridge provider via the bridge connection device, wherein the set of transit data originates from a data stream accessible by the bridge provider, and (d) storing at least a portion of the set of transit data on a memory of the active container.

Example 32

The method of Example 31, further comprising: (a) identifying an alert that is associated with the active container based upon the portion of the set of transit data, wherein the alert indicates a risk associated with the safe transit of a material stored in the active container to a recipient, and (b) providing an indication of the alert to a user via an alert indicator positioned on the exterior of the active container.

Example 33

The method of Example 32, further comprising disconnecting the bridge connection device from the bridge provider, wherein the step of identifying the alert that is associated with the active container occurs after the step of disconnecting the bridge connection device from the bridge provider.

Example 34

The method of any of Examples 32 through 33, further comprising: (a) determining that the alert is a non-critical alert, and (b) providing the non-critical alert to the user via the alert indicator.

Example 35

The method of any of Examples 32 through 34, further comprising: (a) determining that the alert is a critical alert, (b) providing the critical alert to the user via the alert indicator, and (c) operating an automatic lock of the active storage container to prevent access to a storage compartment of the active container.

Example 36

The method of Example 35, wherein determining that the alert is a critical alert further comprises: (a) determine a current location of the active container based upon the portion of the set of transit data, (b) when the connection between the bridge connection device and the bridge provider is lost, access a set of geofence data on the memory and determine whether the current location is within the set of geofence data, and (c) determine that the alert is a critical alert when the current location is not within the set of geofence data.

Example 37

A data bridging system comprising: (a) an active container comprising a storage compartment adapted to store materials during transit, a bridge connection device, a controller configured to control the operation of the bridge connection device, and a memory configured to store a set of local data associated with the active container, wherein the set of local data comprises a container identifier; (b) a bridge provider configured to: (i) receive data from a global positioning data stream and an internet data stream, (ii) provide data to the active container via the bridge connection device, and (iii) transmit data received from the active container via the internet data stream; and (c) a user device comprising a display, the user device configured to: (i) receive data from the internet data stream, and (ii) store the container identifier; wherein the controller is configured to: (i) establish a connection between the bridge connection device and the bridge provider when the bridge connection device detects that the bridge provider is within connectable range of the bridge connection device, (ii) receive a set of location data from the global positioning data stream and store the set of location data on the memory, (iii) create a container status based upon the set of location data and the set of local data, and (iv) transmit the container status to the user device based upon the container identifier, wherein the container status is configured to cause the user device to display a location of the active container via the display.

Example 38

The system of Example 37, wherein: (a) the active container further comprises a temperature management system operable to track and maintain the temperature of the storage compartment, (b) the set of local data comprises a set of temperature data produced by the temperature management system, and (c) the container status is configured to cause the user device to display a location of the active container and a temperature of the storage compartment via the display.

Example 39

The system of any of Examples 37 through 38, wherein the bridge provider is further configured to: (a) receive a set of geofence data associated with the active container via the internet data stream, (b) in response to the bridge connection device disconnecting from the bridge provider, determine a current location of the active container, (c) determine whether the current location is within the set of geofence data, and (i) when the current location is within the set of geofence data, provide an indication to the user device that the active container has arrived at its destination, and (ii) when the current location is not within the set of geofence data, provide an indication to the user device that there is a problem with the active container's delivery.

Example 40

The system of any of Examples 37 through 39, wherein the active container further comprises an automatic lock configured to selectively prevent or allow access to the storage compartment, wherein the controller is further configured to: (a) determine a current location of the active container based upon the set of location data, (b) when the connection between the bridge connection device and the bridge provider is lost, access a set of geofence data on the memory and determine whether the current location is within the set of geofence data, (c) when the current location is outside of the set of geofence data, operate the automatic lock to prevent access to the storage compartment, and (d) when the current location is inside of the set of geofence data, operate the automatic lock to allow access to the storage compartment.

It should be understood that any one or more of the teachings, expressions, embodiments, examples, etc. described herein may be combined with any one or more of the other teachings, expressions, embodiments, examples, etc. that are described herein. For example, any of Examples 1-20 may be adapted and combined with any one or more of Examples 21-40 and vice versa, in addition to other exemplary combinations as described above. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

The invention claimed is:
1. An active container comprising:
 (a) a storage compartment adapted to store materials during transit;
 (b) a bridge connection device;
 (c) a user input device;
 (d) an automatic lock configured to selectively prevent or allow access to the storage compartment;
 (e) an alert indicator;
 (f) a memory operable to store information associated with transit of the active container; and
 (g) a controller configured to control the operation of the bridge connection device, wherein the controller is further configured to:
  (i) establish a connection between the bridge connection device and a bridge provider when the bridge connection device detects that the bridge provider is within connectable range of the bridge connection device,
  (ii) receive a set of transit data from the bridge provider via the bridge connection device, wherein the set of transit data originates from a data stream accessible by the bridge provider,
  (iii) determine whether an alert condition exists based upon the set of transit data,
  (iv) when the alert condition exists based upon the set of transit data originating from the data stream accessible by the bridge provider, provide an alert indication via the alert indicator and, when the alert condition is critical, operate the automatic lock to prevent access to the storage compartment using the connection between the bridge connection device and a bridge provider,
  (v) receive a set of input from the user input device,
  (vi) determine whether the set of input is valid based upon the set of transit data, and
  (vii) when the set of input is valid and when the alert condition is not a critical alert condition, operate the automatic lock to allow access to the storage compartment.

2. The active container of claim 1, further comprising a temperature management system operable to manage the temperature of the storage compartment and a battery configured to power the temperature management system, wherein the data stream is an internet connection, and wherein the controller is further configured to:
 (a) transmit a set of temperature data from the temperature management system to a remote server via the bridge connection device, wherein the set of temperature data describes a measured temperature of the storage compartment during transit, and
 (b) transmit a set of battery data to the remote server via the bridge connection device, wherein the set of battery data describes a measured battery charge of the battery during transit.

3. The active container of claim 1, wherein the data stream is output from a global positioning device, and wherein the set of transit data includes a global positioning coordinate.

4. The active container of claim 1, wherein the bridge provider includes a warehouse, a courier vehicle, or an airplane.

5. The active container of claim 1, wherein the bridge connection device is a low energy Bluetooth transceiver, and wherein the bridge provider is positioned with a vehicle adapted to transport the active container.

6. The active container of claim 5, further comprising a wireless device operable to access the data stream directly, and a battery configured to operate the wireless device and the low energy Bluetooth transceiver, wherein:
 (a) the wireless device consumes more electricity during operation than the low energy Bluetooth Transceiver, and
 (b) the controller is further configured to disable the wireless device when a connection between the low energy Bluetooth transceiver and the bridge provider has been established.

7. The active container of claim 1, wherein the controller is further configured to:

(a) receive an altitude indicator from a sensor of the active container,
(b) determine, based upon the altitude indicator, that the active container is located on an airplane during a communication restricted portion of a flight, and
(c) disable a set of restricted devices during the communication restricted portion of the flight, wherein the bridge connection device is within the set of restricted devices.

8. The active container of claim 7, further comprising a wired bridge connection device, wherein the controller is further configured to:
(a) when the set of restricted devices is disabled, establish a connection between the wired bridge connection device and the bridge provider,
(b) receive the set of transit data from the bridge provider via the wired bridge connection device, wherein the set of transit data originates, and
(c) transmit a set of local transit data via the bridge provider to a remote server.

9. The active container of claim 1, wherein the controller is further configured to:
(a) determine a current location of the active container based upon the set of transit data,
(b) when the connection between the bridge connection device and the bridge provider is lost, access a set of geofence data on the memory and determine whether the current location is within the set of geofence data, and
(c) when the current location is outside of the set of geofence data, operate the automatic lock to prevent access to the storage compartment.

10. The active container of claim 1, further comprising a temperature management system operable to manage the temperature of the storage compartment, wherein the critical alert condition indicates that the temperature of the storage compartment exceeded a predetermined temperature for a predetermined duration.

11. An active container comprising:
(a) a storage compartment adapted to store materials during transit;
(b) a GPS or cellular data receiver configured to receive signals over a GPS or cellular network;
(c) a bridge connection device;
(d) a user input device;
(e) an automatic lock configured to selectively prevent or allow access to the storage compartment;
(f) an alert indicator;
(g) a memory operable to store information associated with transit of the active container;
(h) a temperature management system operable to manage the temperature of the storage compartment; and
(i) a controller configured to control the operation of the GPS or cellular data receiver and the bridge connection device, wherein the controller is further configured to:
   (i) establish a connection between the GPS or cellular data receiver of the active container and the GPS or cellular network,
   (ii) establish a connection between the bridge connection device and a bridge provider when the bridge connection device detects that the bridge provider is within connectable range of the bridge connection device,
   (iii) receive a set of transit data from the bridge provider via the bridge connection device instead of using the connection to the GPS or cellular data receiver of the active container,
   (iv) determine whether an alert condition exists based upon the set of transit data,
   (v) when the alert condition exists based upon the set of transit data, provide an alert indication via the alert indicator and, when the alert condition is critical, operate the automatic lock to prevent access to the storage compartment,
   (vi) receive a set of input from the user input device,
   (vii) determine whether the set of input is valid based upon the set of transit data, and
   (viii) when the set of input is valid and when the alert condition is not a critical alert condition, operate the automatic lock to allow access to the storage compartment.

12. The active container of claim 11, wherein the critical alert condition is configured to indicate that the temperature within the storage compartment exceeded a predetermined temperature.

13. The active container of claim 11, wherein the controller is further configured to establish the connection between the bridge connection device and the bridge provider when the bridge connection device detects that the bridge provider is within connectable range of the bridge connection device in response to a loss of a connection from the GPS or cellular data receiver of the active container.

14. The active container of claim 11, wherein the bridge connection device is a Wi-Fi, Bluetooth, or a physical data connection physically coupled with the active container.

15. The active container of claim 11, further comprising a display, wherein the critical alert condition produces a visual alert on the display that the materials inside of the storage compartment should not be used.

16. An active container comprising:
(a) a storage compartment adapted to store materials during transit;
(b) a GPS or cellular data receiver configured to receive signals over a GPS or cellular network;
(c) a bridge connection device;
(d) a user input device;
(e) an automatic lock configured to selectively prevent or allow access to the storage compartment;
(f) an alert indicator;
(g) a memory operable to store information associated with transit of the active container; and
(h) a controller configured to control the operation of the GPS or cellular data receiver and the bridge connection device, wherein the controller is further configured to:
   (i) establish a connection between the GPS or cellular data receiver of the active container and the GPS or cellular network,
   (ii) establish a connection between the bridge connection device and a bridge provider in response to a loss of a connection from the GPS or cellular data receiver of the active container,
   (iii) receive a set of transit data from the bridge provider via the bridge connection device,
   (iv) determine whether an alert condition exists based upon the set of transit data,
   (v) when the alert condition exists based upon the set of transit data, provide an alert indication via the alert indicator and, when the alert condition is critical, operate the automatic lock to prevent access to the storage compartment,
   (vi) receive a set of input from the user input device,
   (vii) determine whether the set of input is valid based upon the set of transit data, and (viii) when the set of input is valid and when the alert condition is not a critical alert condition, operate the automatic lock to allow access to the storage compartment.

17. The active container of claim 16, wherein the controller is further configured to when the set of input is valid and when the alert condition is not a critical alert condition, operate the automatic lock to allow access to the storage compartment using the connection between the bridge connection device and a bridge provider instead of using the connection from the GPS or cellular data receiver of the active container.

18. The active container of claim 16, wherein the controller is further configured to prevent access to the storage compartment without an access code or remote authorization in response to determining the alert condition is critical.

19. The active container of claim 16, further comprising a temperature management system operable to manage the temperature of the storage compartment, wherein the critical alert condition indicates that the temperature of the storage compartment exceeded a predetermined temperature.

20. The active container of claim 16, further comprising a temperature management system operable to manage the temperature of the storage compartment, wherein the critical alert condition indicates that the temperature within the storage compartment exceeded a predetermined temperature for a predetermined duration.

* * * * *